United States Patent
Yabu et al.

(10) Patent No.: US 9,866,896 B2
(45) Date of Patent: Jan. 9, 2018

(54) VIDEO RECEPTION DEVICE, VIDEO RECOGNITION METHOD, AND ADDITIONAL INFORMATION DISPLAY SYSTEM

(71) Applicant: Panasonic Intellectual Property Management Co., Ltd., Osaka (JP)

(72) Inventors: Hiroshi Yabu, Kyoto (JP); Hirotaka Oku, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/888,444

(22) PCT Filed: Jul. 3, 2014

(86) PCT No.: PCT/JP2014/003548
§ 371 (c)(1),
(2) Date: Nov. 2, 2015

(87) PCT Pub. No.: WO2015/033501
PCT Pub. Date: Mar. 12, 2015

(65) Prior Publication Data
US 2016/0088341 A1    Mar. 24, 2016

(30) Foreign Application Priority Data

Sep. 4, 2013  (JP) .................................. 2013-182715
Mar. 26, 2014  (JP) .................................. 2014-063496

(51) Int. Cl.
*H04N 21/431*    (2011.01)
*H04N 21/4725*    (2011.01)
(Continued)

(52) U.S. Cl.
CPC ..... *H04N 21/4316* (2013.01); *G06K 9/00711* (2013.01); *G06K 9/00744* (2013.01);
(Continued)

(58) Field of Classification Search
None
See application file for complete search history.

(56) References Cited

U.S. PATENT DOCUMENTS 7,712,123 B2    5/2010  Miyaoku et al.
8,199,221 B2    6/2012  Yoshizumi
(Continued)

FOREIGN PATENT DOCUMENTS

EP    1286541 A1    2/2003
EP    1 954 041 A1    8/2008
(Continued)

OTHER PUBLICATIONS

International Search Report of PCT application No. PCT/JP2014/003548 dated Oct. 7, 2014.
(Continued)

*Primary Examiner* — Nicholas Corbo
(74) *Attorney, Agent, or Firm* — McDermott Will & Emery LLP

(57) ABSTRACT

Video recognition processing on video signals input from an outside is performed. Hence, video reception device which is configured to transmit and receive data through communication network includes input unit, video extraction unit, video recognition region setting unit, control unit and additional information display control unit. The video recognition region setting unit sets a video recognition region to a partial video based on feature information indicating features of video signals input from an outside. The additional information display control unit generates content recognition information in the video recognition region of the
(Continued)

partial video. The control unit performs control of requesting video recognition device to perform video recognition processing on this content recognition information.

11 Claims, 14 Drawing Sheets

(51) Int. Cl.
| | |
|---|---|
| *H04N 21/482* | (2011.01) |
| *H04N 21/485* | (2011.01) |
| *H04N 21/488* | (2011.01) |
| *H04N 21/858* | (2011.01) |
| *G06K 9/00* | (2006.01) |
| *H04N 5/265* | (2006.01) |
| *H04N 21/234* | (2011.01) |
| *H04N 21/81* | (2011.01) |
| *H04N 21/4722* | (2011.01) |
| *H04N 21/8352* | (2011.01) |
| *H04N 21/8358* | (2011.01) |
| *H04N 21/237* | (2011.01) |
| *H04N 21/437* | (2011.01) |

(52) U.S. Cl.
CPC ....... *H04N 5/265* (2013.01); *H04N 21/23424* (2013.01); *H04N 21/4722* (2013.01); *H04N 21/4725* (2013.01); *H04N 21/4828* (2013.01); *H04N 21/4856* (2013.01); *H04N 21/4884* (2013.01); *H04N 21/4888* (2013.01); *H04N 21/8133* (2013.01); *H04N 21/8352* (2013.01); *H04N 21/8358* (2013.01); *H04N 21/8586* (2013.01); *H04N 21/237* (2013.01); *H04N 21/437* (2013.01)

(56) References Cited

U.S. PATENT DOCUMENTS

| | | | |
|---|---|---|---|
| 8,254,720 B2 | 8/2012 | Matsuzaki | |
| 8,421,921 B1 | 4/2013 | Woodall | |
| 8,582,952 B2 | 11/2013 | Circlaeys et al. | |
| 9,148,610 B2 | 9/2015 | Yabu | |
| 2002/0001453 A1 | 1/2002 | Mizumura et al. | |
| 2002/0097339 A1 | 7/2002 | Kwon | |
| 2002/0126990 A1 | 9/2002 | Rasmussen et al. | |
| 2002/0143902 A1 | 10/2002 | Chung et al. | |
| 2003/0051252 A1 | 3/2003 | Miyaoku et al. | |
| 2003/0084462 A1* | 5/2003 | Kubota ............... H04N 1/00291 725/153 |
| 2003/0149983 A1* | 8/2003 | Markel ............... H04N 7/088 725/51 |
| 2004/0165865 A1* | 8/2004 | Seo ............... G11B 27/034 386/240 |
| 2005/0071425 A1 | 3/2005 | Chung et al. | |
| 2005/0172312 A1* | 8/2005 | Lienhart ............... G06F 17/30802 725/19 |
| 2006/0187358 A1 | 8/2006 | Lienhart et al. | |
| 2006/0200842 A1 | 9/2006 | Chapman et al. | |
| 2007/0157242 A1 | 7/2007 | Cordray et al. | |
| 2007/0233285 A1 | 10/2007 | Yamamoto | |
| 2007/0261079 A1 | 11/2007 | Pack et al. | |
| 2008/0181515 A1 | 7/2008 | Kondo | |
| 2008/0310731 A1 | 12/2008 | Stojancic et al. | |
| 2009/0006375 A1 | 1/2009 | Lax et al. | |
| 2009/0034937 A1 | 2/2009 | Kusunoki et al. | |
| 2009/0177758 A1 | 7/2009 | Banger et al. | |
| 2009/0244372 A1* | 10/2009 | Petronelli ............ H04N 5/44513 348/468 |
| 2009/0279738 A1 | 11/2009 | Sasaki | |
| 2010/0067873 A1 | 3/2010 | Sasaki et al. | |
| 2010/0259684 A1 | 10/2010 | Kambe | |
| 2010/0318515 A1 | 12/2010 | Ramanathan et al. | |
| 2011/0078202 A1 | 3/2011 | Kamibeppu | |
| 2011/0135283 A1 | 6/2011 | Poniatowki et al. | |
| 2011/0137976 A1* | 6/2011 | Poniatowski .... H04N 21/42203 709/203 |
| 2011/0181693 A1 | 7/2011 | Lee et al. | |
| 2011/0243474 A1 | 10/2011 | Ito | |
| 2011/0246202 A1 | 10/2011 | McMillan et al. | |
| 2012/0020568 A1 | 1/2012 | Kogane | |
| 2012/0075421 A1 | 3/2012 | Tsukagoshi | |
| 2012/0092248 A1 | 4/2012 | Prabhala | |
| 2012/0128241 A1 | 5/2012 | Jung | |
| 2012/0320091 A1 | 12/2012 | Rajaraman et al. | |
| 2012/0321125 A1* | 12/2012 | Choi ..................... G06K 9/6206 382/100 |
| 2013/0042289 A1 | 2/2013 | Park | |
| 2013/0047178 A1* | 2/2013 | Moon ................. H04N 21/4122 725/25 |
| 2013/0054645 A1 | 2/2013 | Bhagavathy et al. | |
| 2013/0094590 A1 | 4/2013 | Laksono et al. | |
| 2013/0106999 A1 | 5/2013 | Newton et al. | |
| 2013/0111514 A1 | 5/2013 | Slavin et al. | |
| 2013/0129219 A1 | 5/2013 | Takenouchi et al. | |
| 2013/0145395 A1 | 6/2013 | Jeong et al. | |
| 2013/0167189 A1 | 6/2013 | Lucas | |
| 2013/0198773 A1 | 8/2013 | Jentz et al. | |
| 2013/0202150 A1 | 8/2013 | Sinha et al. | |
| 2013/0205321 A1 | 8/2013 | Sinha et al. | |
| 2013/0230292 A1 | 9/2013 | Pierce et al. | |
| 2013/0246457 A1 | 9/2013 | Stojancic et al. | |
| 2013/0247117 A1 | 9/2013 | Yamada et al. | |
| 2013/0254802 A1 | 9/2013 | Lax et al. | |
| 2013/0308818 A1 | 11/2013 | MacIntosh et al. | |
| 2014/0007155 A1 | 1/2014 | Vemparala et al. | |
| 2014/0082655 A1 | 3/2014 | Moon et al. | |
| 2014/0123204 A1 | 5/2014 | Moon et al. | |
| 2014/0229485 A1 | 8/2014 | Icho et al. | |
| 2014/0230002 A1 | 8/2014 | Kitazato | |
| 2015/0020094 A1* | 1/2015 | Moon ................... H04N 21/478 725/32 |
| 2015/0026718 A1 | 1/2015 | Seyller | |

FOREIGN PATENT DOCUMENTS

| | | |
|---|---|---|
| EP | 2337345 A1 | 6/2011 |
| EP | 2760200 | 7/2014 |
| EP | 2763427 A1 | 8/2014 |
| JP | H04-245552 A | 9/1992 |
| JP | H09-185720 A | 7/1997 |
| JP | H10-126721 A | 5/1998 |
| JP | 10-214258 | 8/1998 |
| JP | 2000-287189 A | 10/2000 |
| JP | 2000-293626 A | 10/2000 |
| JP | 2002-175311 A | 6/2002 |
| JP | 2002-209204 | 7/2002 |
| JP | 2002-232372 A | 8/2002 |
| JP | 2002-334010 A | 11/2002 |
| JP | 2004-007323 | 1/2004 |
| JP | 2004-104368 A | 4/2004 |
| JP | 2004-303259 A | 10/2004 |
| JP | 2004-341940 A | 12/2004 |
| JP | 2005-167452 A | 6/2005 |
| JP | 2005-167894 A | 6/2005 |
| JP | 2005-347806 A | 12/2005 |
| JP | 2006-030244 A | 2/2006 |
| JP | 2006-303936 A | 11/2006 |
| JP | 2007-049515 A | 2/2007 |
| JP | 2007-134948 A | 5/2007 |
| JP | 2008-040622 A | 2/2008 |
| JP | 2008-042259 A | 2/2008 |
| JP | 2008-116792 A | 5/2008 |
| JP | 2008-176396 A | 7/2008 |
| JP | 2008-187324 A | 8/2008 |
| JP | 2009-088777 A | 4/2009 |
| JP | 2010-164901 | 7/2010 |
| JP | 2010-271987 A | 12/2010 |
| JP | 2011-034323 A | 2/2011 |
| JP | 2011-059504 A | 3/2011 |
| JP | 2011-234343 A | 11/2011 |

(56) References Cited

FOREIGN PATENT DOCUMENTS

| | | |
|---|---|---|
| JP | 2012-055013 A | 3/2012 |
| JP | 2012-231383 A | 11/2012 |
| JP | 2013-038773 A | 2/2013 |
| JP | 2013-070268 A | 4/2013 |
| JP | 2013-125191 A | 6/2013 |
| JP | 2013-164753 A | 8/2013 |
| WO | 2004/080073 A2 | 9/2004 |
| WO | 2007/039994 A1 | 4/2007 |
| WO | 2009/011030 A1 | 1/2009 |
| WO | 2010/022000 A2 | 2/2010 |
| WO | 2013/042531 | 3/2013 |
| WO | 2013/047948 A1 | 4/2013 |
| WO | 2013/103273 | 7/2013 |
| WO | 2013/119082 | 8/2013 |
| WO | 2014/006903 A1 | 1/2014 |

OTHER PUBLICATIONS

The Extended European Search Report dated Jul. 8, 2016 for the related European Patent Application No. 14838764.0.
The Extended European Search Report dated Jul. 19, 2016 for the related European Patent Application No. 14838765.7.
Non-Final Office Action issued in U.S. Appl. No. 14/787,721, dated Aug. 4, 2016.
Final Office Action issued in U.S. Appl. No. 14/787,721, dated Dec. 2, 2016.
Non-Final Office Action issued in U.S. Appl. No. 14/787,759, dated Dec. 29, 2016.
Non-Final Office Action issued in U.S. Appl. No. 14/888,447, dated Sep. 6, 2016.
Final Office Action issued in U.S. Appl. No. 14/888,447, dated Jan. 10, 2017.
Non-Final Office Action issued in U.S. Appl. No. 14/888,449, dated Nov. 21, 2016.
Non-Final Office Action issued in U.S. Appl. No. 14/888,445, dated Aug. 12, 2016.
Non-Final Office Action issued in U.S. Appl. No. 14/890,121, dated Sep. 14, 2016.
The Extended European Search Report dated Jul. 5, 2016 for the related European Patent Application No. 14829140.4.
The Extended European Search Report dated Jun. 14, 2016 for the related European Patent Application No. 14832570.7 (with English translation).
International Search Report of PCT application No. PCT/JP2014/003526 dated Oct. 7, 2014 (with English translation).
International Search Report of PCT application No. PCT/JP2014/003546 dated Oct. 7, 2014 (with English translation).
International Search Report of International Patent Application No. PCT/JP2014/003761, dated Oct. 21, 2014 (with English translation).
International Search Report of International Patent Application No. PCT/JP2014/003762, dated Oct. 21, 2014 (with English translation).
International Search Report of International Patent Application No. PCT/JP2014/003547, dated Oct. 7, 2014 (with English translation).
International Search Report of International Patent Application No. PCT/JP2014/003760, dated Oct. 7, 2014 (with English translation).
International Search Report of International Patent Application No. PCT/JP2015/004112, dated Oct. 27, 2015 (with English translation).
International Search Report of International Patent Application No. PCT/JP2015/003527, dated Aug. 11, 2015 (with English translation).
International Search Report of International Patent Application No. PCT/JP2015/004187, dated Oct. 20, 2015 (with English translation).
Gonzales R et al: "Digital Image Processing, Matching by correlation", Dec. 31, 2002 (Dec. 31, 2002), Digital Image Processing, Prentice-Hall Upper Saddle River, New Jersey, pp. 701-704, XP002657364.
Template matching, Wikipedia, Mar. 11, 2013 (Mar. 11, 2013), XP002759268, Retrieved from the Internet: URL:https://en.wikipedia.org/w/index.php?title=Template_matching&oldid=543510371 [retrieved on Jun. 28, 2016].
Final Office Action issued in U.S. Appl. No. 14/888,449, dated Mar. 6, 2017.
The Extended European Search Report dated Feb. 28, 2017 for the related European Patent Application No. 14841401.4.
The Extended European Search Report dated Mar. 3, 2017 for the related European Patent Application No. 14841377.6.
Final Office Action issued in U.S. Appl. No. 14/888,445, dated Jan. 30, 2017.
Final Office Action issued in related U.S. Appl. No. 13/958,863, dated Jan. 23, 2015.
Final Office Action issued in U.S. Appl. No. 14/890,121, dated Mar. 13, 2017.
Non-Final Office Action issued in related U.S. Appl. No. 13/958,863, dated Aug. 14, 2014.
Non-Final Office Action issued in U.S. Appl. No. 14/787,721, dated Jun. 7, 2017.
Notice of Allowance issued in U.S. Appl. No. 14/787,759, dated May 9, 2017.
Non-Final Office Action issued in U.S. Appl. No. 14/888,445, dated Jun. 9, 2017.
Notice of Allowance issued in U.S. Appl. No. 14/888,447, dated Jul. 3, 2017.
Non-Final Office Action issued in U.S. Appl. No. 14/888,449, dated Jul. 5, 2017.
The Extended European Search Report dated May 29, 2017 for the related European Patent Application No. 15832982.1.
The Extended European Search Report dated May 11, 2017 for the related European Patent Application No. 15822221.6.
Non-Final Office Action issued U.S. Appl. No. 14/890,121, dated Sep. 6, 2017.

* cited by examiner

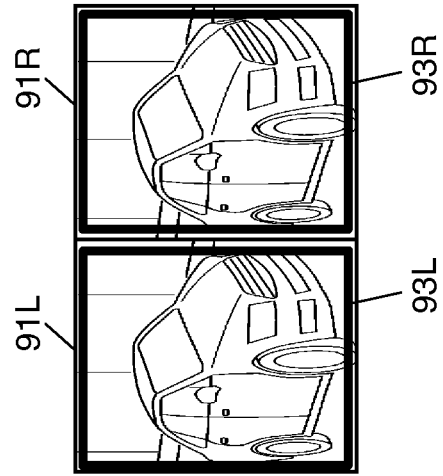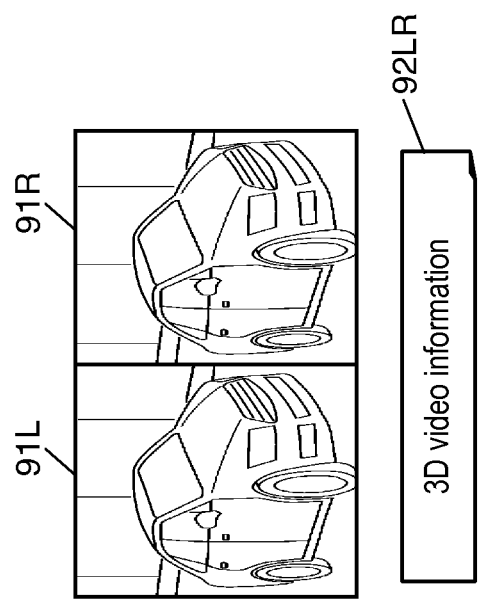

VIDEO RECEPTION DEVICE, VIDEO RECOGNITION METHOD, AND ADDITIONAL INFORMATION DISPLAY SYSTEM

TECHNICAL FIELD

The present disclosure relates to a video reception device which obtains additional information related to video signals input from an outside, and superimposes the additional information on the video signals.

BACKGROUND ART

Patent Literature 1 has disclosed a data processing system. In this system, a client device transmits video data to a server device which is a video recognition device through a network, and requests the server device to perform video recognition processing. The server device performs video recognition based on the received video data, and transmits a video recognition result to the client device through the network.

CITATION LIST

Patent Literature

PTL 1: Unexamined Japanese Patent Publication No. H10-214258

SUMMARY

The present disclosure provides a video reception device, a video recognition method and an additional information display system which are effective to obtain additional information related to video signals input from an outside, and superimpose the obtained additional information on the video signals.

The video reception device according to the present disclosure is configured to transmit and receive data through a communication network, and includes an input unit, a video extraction unit, a video recognition region setting unit, a control unit and an additional information display control unit. The input unit is configured to receive an input of a video signal output from a video transmission device installed outside, and content related information including feature information indicating a feature of the video signal. The video extraction unit is configured to extract a partial video for video recognition processing, from the video signal. The video recognition region setting unit is configured to set a video recognition region to the partial video based on the feature information included in the content related information. The control unit is configured to perform control of transmitting content recognition information to a video recognition device connected to the communication network so as to request the video recognition device to perform the video recognition processing, obtaining a result of the video recognition processing from the video recognition device, and obtaining additional information based on the result of the video recognition processing from an additional information distribution device connected to the communication network. The additional information display control unit is configured to generate content recognition information in the video recognition region of the partial video.

A video recognition method according to the present disclosure is a video recognition method of a video reception device configured to transmit and receive data through a communication network, and includes: extracting a partial video for video recognition processing, from a video signal input from an outside; receiving content related information input from an outside, and including feature information indicating a feature of the video signal; setting a video recognition region to the partial video based on the feature information; generating content recognition information in the video recognition region of the partial video; transmitting content recognition information to a video recognition device connected to the communication network so as to request the video recognition device to perform the video recognition processing, and obtaining a result of the video recognition processing from the video recognition device; and obtaining additional information based on the result of the video recognition processing, from an additional information distribution device connected to the communication network.

An additional information display system according to the present disclosure includes a video reception device, a video recognition device and an additional information distribution device configured to transmit and receive data to each other through a communication network. The video reception device includes an input unit, a video extraction unit, a video recognition region setting unit, a control unit and an additional information display control unit. The input unit is configured to receive an input of a video signal output from a video transmission device installed outside, and content related information including feature information indicating a feature of the video signal. The video extraction unit is configured to extract a partial video for video recognition, from the video signal. The video recognition region setting unit is configured to set a video recognition region to the partial video based on the feature information included in the content related information. The control unit is configured to perform control of transmitting content recognition information to a video recognition device through the communication network so as to request the video recognition device to perform the video recognition processing, obtaining a result of the video recognition processing from the video recognition device through the communication network, and obtaining additional information based on the result of the video recognition processing from an additional information distribution device through the communication network. The additional information display control unit is configured to generate content recognition information in the video recognition region of the partial video. The video recognition device is configured to perform the video recognition processing on the content recognition information received through the communication network, and transmit the result of the video recognition processing to the video reception device through the communication network. The additional information distribution device is configured to transmit additional information corresponding to the result of the video recognition processing received through the communication network, to the video reception device through the communication network.

BRIEF DESCRIPTION OF DRAWINGS

FIG. 9D is a view schematically illustrating an example of video signals of a 3D video output from the video transmission device and input to the video reception device.

FIG. 9E is a view schematically illustrating an example of a video recognition region set to 3D video signals by the video recognition region setting unit of the video reception device according to the first exemplary embodiment.

DESCRIPTION OF EMBODIMENTS

Exemplary embodiments will be described in detail below optionally with reference to the drawings. However, the exemplary embodiments will not be described in detail more than necessary in some cases. For example, in some cases, matters which have already been well known will not be described in detail, and substantially the same components will not be described again. This is to prevent the following description from being redundant more than necessary, and help one of ordinary skill in the art understand the following description.

In addition, the accompanying drawings and the following description are provided to make it easy for one of ordinary skill in the art to sufficiently understand the present disclosure, and do not intend to limit the subject matters recited in the claims.

First Exemplary Embodiment

The first exemplary embodiment will be described below with reference to FIGS. 1 to 12.

[1-1. Configuration]

[1-1-1. Outline of System Configuration]

Figure 1:
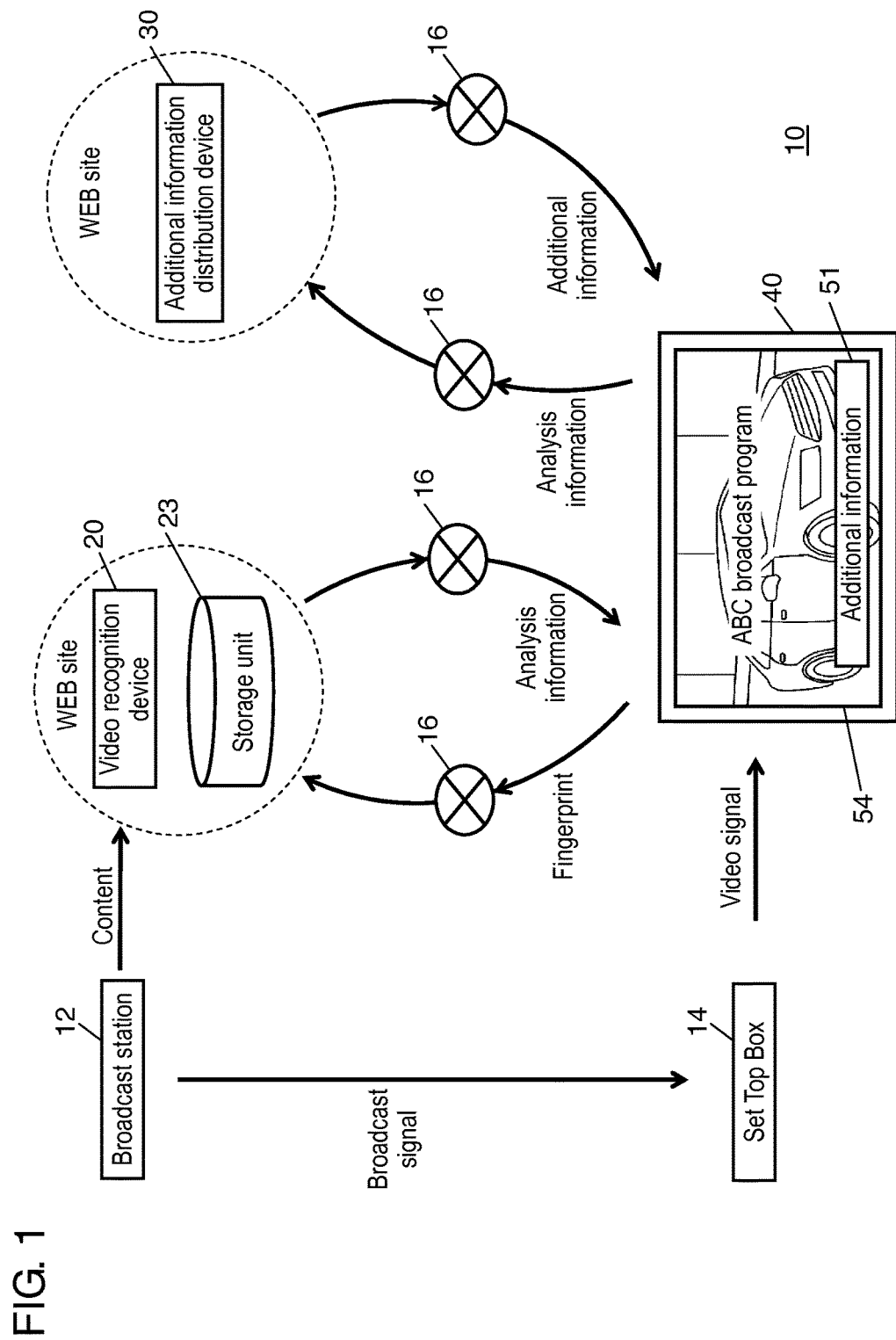
FIG. 1 is a view schematically illustrating an example of a configuration of an additional information display system according to a first exemplary embodiment.

FIG. 1 is a view schematically illustrating an example of a configuration of additional information display system 10 according to the first exemplary embodiment. Additional information display system 10 includes broadcast station 12, STB (Set Top Box) 14 which is a video transmission device, video recognition device 20, additional information distribution device 30 and video reception device 40. Additional information display system 10 is a communication system which is configured to specify which content a video received by video reception device 40 is using a video recognition technique of video recognition device 20, obtain additional information related to the content from additional information distribution device 30, and display the additional information on video reception device 40.

Video reception device 40, video recognition device 20 and additional information distribution device 30 are connected with each other through communication network 16.

Communication network 16 is configured as a wired network, a wireless network or a combination of wired and wireless networks. Communication network 16 is, for example, the Internet, yet may be an intranet, a commercial line, other communication lines or a combination of the intranet, the commercial line and other communication lines.

Video reception device 40 and STB 14 are connected with each other through a communication interface. The communication interface is, for example, a HDMI (registered trademark) (High-Definition Multimedia Interface) yet may be a video cable or a wireless communication interface such as Wi-Fi (registered trademark), Bluetooth (registered trademark) or a wireless LAN (Local Area Network).

Broadcast station 12 is a transmission device which is configured to transmit (broadcast) broadcast signals. Broadcast station 12 broadcasts a television program including a main program and commercial messages (CM) by converting the television program into video signals, and superimposing the video signals on broadcast signals. The main program and the CMs are switched to each other as time passes. A main program and CMs will be referred to as "content" below. That is, broadcast station 12 broadcasts content which is switched as time passes. In addition, the transmission device is by no means limited to broadcast station 12, and only needs to transmit or broadcast content which is switched as time passes.

Further, when content to broadcast includes unique features, in some cases, broadcast station 12 broadcasts or transmits information including information (referred to as "feature information" below) indicating the content or features of video signals of the content, together with the video signals. This information including the feature information will be referred to as "content related information" below. Content including unique features is, for example, content of stereoscopic images (which are three dimensional video images and will be also referred to as a "3D video". Further, video signals of the 3D video are also referred to as "3D video signals"), content including a video on which a caption is superimposed or the like. In some cases, the content related information related to a 3D video includes feature information related to, for example, a video signal transmission method of 3D videos (a side-by-side method, a top-and-bottom method, a line-by-line method, a frame sequential method or the like). Further, in some cases, the content related information related to a caption includes feature information related to whether or not there is a caption, a position and a size of the caption, a color of the caption, a font and the like. Furthermore, in some cases, the content related information includes feature information related to a broadcast format of broadcast signals.

STB 14 is a receiver (tuner) which is configured to receive broadcast signals broadcast from broadcast station 12 and extract video signals from the broadcast signals. STB 14 may have a function of decoding the received video signals when, for example, broadcast station 12 broadcasts digital video signals. STB 14 receives a channel selected from a plurality of channels broadcast by broadcast station 12 according to a user's instruction, and outputs video signals of this channel to video reception device 40 through the communication interface (e.g. the HDMI (registered trademark)). Further, STB 14 can also receive content related information and output this content related information to video reception device 40 when broadcast station 12 transmits the content related information together with video signals. In addition, the video transmission device is by no means limited to STB 14, and may be a recording device or the like which has, for example, a recording function, a broadcast signal receiving function and a video signal output function.

In addition, STB 14 may be configured to, when broadcast station 12 broadcasts content including unique features, detect the features, generate content related information including feature information indicating the features, and output the content related information to video reception device 40. STB 14 may be configured to, when, for example, broadcast station 12 broadcasts content of a 3D video, detect a transmission method of 3D video signals, generate feature information indicating the detection result (the transmission method of the 3D video signals) and output the feature information to video reception device 40. Alternatively, STB 14 may be configured to, when broadcast station 12 broadcasts content including a video on which a caption is superimposed, detect this caption, generate feature information indicating a display position and a display size of the detected caption and output the feature information to video reception device 40. Alternatively, STB 14 may be configured to, when superimposing a caption or an OSD (On Screen Display) on video signals, generate feature information related to a display position and a display size of the caption or the OSD, and output the feature information to video reception device 40. In addition, in the present exemplary embodiment, feature information pieces generated by detecting features of video signals broadcast by broadcast station 12 and output by a video transmission device such as STB 14 are also regarded as part of content related information.

Video reception device 40 is a video reception device which is configured to display, on displaying unit 54, a video based on video signals input from an outside, and is, for example, a television receiver. Video reception device 40 is connected to communication network 16, and can transmit and receive data to and from video recognition device 20 and additional information distribution device 30 through communication network 16.

Video reception device 40 according to the present exemplary embodiment is configured to perform the following operations. Video reception device 40 performs content specifying processing (content specifying processing based on video recognition processing) on video signals input from the video transmission device (e.g. STB 14) through the communication network using video recognition device 20. The content specifying processing refers to processing of specifying content represented by video signals. Video reception device 40 receives analysis information transmitted as a content specifying processing result from video recognition device 20, obtains additional information (e.g. advertisement information) related to the content from additional information distribution device 30 based on this analysis information, superimposes the obtained additional information on the video signals, and displays the additional information on displaying unit 54.

More specifically, video reception device 40 cyclically extracts a partial video by cyclically clipping part of input video signals, and transmits content recognition information generated from the partial video, and a content specifying processing (the content specifying processing based on the video recognition processing) request (also referred to as a "video recognition request" below) to video recognition device 20 through communication network 16. Further, video reception device 40 obtains the content specifying processing result (analysis information) of the content recognition information from video recognition device 20 through communication network 16. Furthermore, video reception device 40 obtains the additional information related to the obtained content specifying processing result (analysis information) from additional information distribution device 30 through communication network 16. Still further, video reception device 40 superimposes an image (indicated as "additional information 51" in FIG. 1) which is based on the obtained additional information, on a video which is being displayed on displaying unit 54. Details of the above will be described later.

Further, video reception device 40 can also receive content related information output from STB 14. In some cases, this content related information includes feature information indicating a transmission method of 3D video signals when, for example, broadcast station 12 broadcasts 3D video content. In some cases, this content related information includes feature information indicating a location (coordinates) and a size of a region on which a caption is superimposed when a video on which the caption is superimposed is included in content broadcast from broadcast station 12. Further, in some cases, when STB 14 superimposes a caption or an OSD on video signals, the content related information includes feature information indicating a location (coordinates) or a size of a region on which the caption or the OSD is superimposed.

In addition, an example where content recognition information is a fingerprint will be described in the present exemplary embodiment. The content recognition information is information for recognizing a video, and the fingerprint is a hash value of each image which configures a partial video or a moving image. However, the content recognition information only needs to be information (data) which can be used for video recognition processing, and is by no means limited to a fingerprint (hash value).

In addition, in the present exemplary embodiment, an example where additional information is "advertisement information related to content" will be described. However, the additional information is by no means limited to advertisement information and may be, for example, tourist information, history information, personal profile information, a URL (Uniform Resource Locator), public bulletin information, information related to a program which is being broadcast and social information such as Twitter (registered trademark).

Video recognition device 20 is a server device connected to communication network 16, and is a website which performs content specifying processing based on video recognition processing. The content specifying processing is processing of performing video recognition processing based on a received fingerprint as described above, and specifying content represented by the fingerprint based on the video recognition processing result. Hence, video recognition device 20 analyzes the content broadcast by broadcast station 12, and performs video recognition processing using this analysis result.

Video recognition device 20 obtains substantially all items of content broadcast from broadcast station 12. Further, video recognition device 20 analyzes the obtained content, checks a time, a volume, a broadcast format, details, a genre, characters, a time table or the like of the content, and creates analysis information. Furthermore, video recognition device 20 creates a fingerprint from video signals of the content obtained from broadcast station 12. Video recognition device 20 may obtain content by receiving broadcast signals broadcast from the broadcast station, or may obtain content by receiving video signals transmitted from broadcast station 12 through a dedicated video line or the like. Further, this analysis may be performed, for example, automatically or manually by an operator. Analysis information which is this analysis result is stored together with information related to the content in storage unit 23 of video recognition device 20.

When receiving a video recognition request accompanied by a fingerprint transmitted from video reception device 40 through communication network 16, video recognition device 20 cross-checks this fingerprint and fingerprints generated in advance by video recognition device 20 and stored in storage unit 23 (video recognition processing) and specifies the content corresponding to this fingerprint. Thus, video recognition device 20 performs content specifying processing of determining from what content of a partial video the fingerprint transmitted from video reception device 40 is generated, and specifying the content. Further, video recognition device 20 reads an analysis result (analysis information) related to the specified content from storage unit 23, and returns the read information as the content specifying processing result to video reception device 40 through communication network 16.

Video recognition processing based on such a method (content specifying processing based on video recognition processing) will be also referred to as "ACR (Automatic Content Recognition)".

Additional information distribution device 30 is a server device connected to communication network 16, and is a website (advertisement distribution site) which holds and distributes advertisement information of various commercial goods. When receiving the content specifying processing result (analysis information based on the content specifying processing result which video reception device 40 obtains from video recognition device 20) transmitted from video reception device 40 through communication network 16, additional information distribution device 30 transmits additional information related to this content specifying processing result (analysis information) to video reception device 40 through communication network 16. This additional information is, for example, advertisement information related to content specified by content specifying processing.

[1-1-2. Configurations of Video Recognition Device and Video Reception Device]

Figure 2:
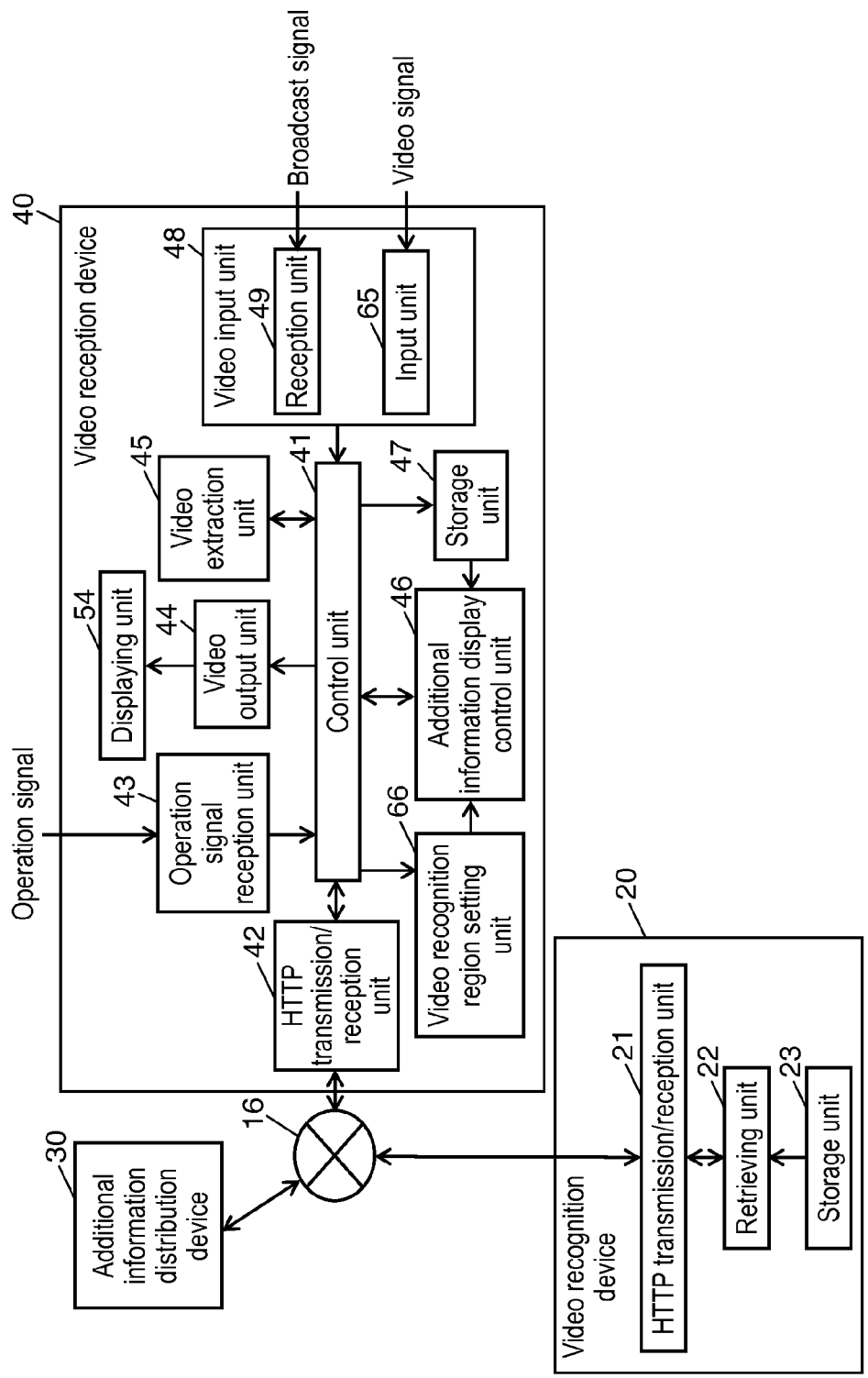
FIG. 2 is a block diagram schematically illustrating an example of configurations of a video recognition device and a video reception device according to the first exemplary embodiment.

FIG. 2 is a block diagram schematically illustrating an example of configurations of video recognition device 20 and video reception device 40 according to the first exemplary embodiment.

In addition, FIG. 2 illustrates a main circuit block related to an operation described in the present exemplary embodiment, and does not illustrate functions and circuit blocks related to other operations for ease of understanding of the operations described in the present exemplary embodiment. Further, each circuit block illustrated in FIG. 2 may be configured as an independent circuit. Alternatively, each circuit block may be configured such that a program created to realize one or a plurality of circuit blocks illustrated in FIG. 2 is executed by a processor.

Video recognition device 20 is a server device which includes HTTP (Hypertext Transfer Protocol) transmission/reception unit 21, retrieving unit 22 and storage unit 23. Video recognition device 20 is configured to provide service of content specifying processing based on video recognition processing, to video reception device 40 through communication network 16.

HTTP transmission/reception unit 21 is an interface for communication, and is, for example, a communication adapter which is adapted to standards of the Ethernet (registered trademark). HTTP transmission/reception unit 21 is configured to transmit and receive data to and from video reception device 40 through communication network 16.

Storage unit 23 is a storage device which is configured by, for example, a HDD (Hard Disk Drive). Storage unit 23 is configured to associate a fingerprint of content broadcast from broadcast station 12, and analysis information of an analysis result of the content with the content to store. This fingerprint is, for example, a hash value of each image which configures a moving image.

Storage unit 23 associates fingerprints and analysis results (analysis information) of, for example, all channels (e.g. 300 channels) broadcast from broadcast station 12 to store per content (e.g. a main program or a CM) with a slight time delay (e.g. 10 seconds) from a start of a broadcast. This analysis result (analysis information) may include, for example, a program title, a CM title, a program outline, a CM outline, characters, a place related to a video, and a URL.

Retrieving unit 22 is configured to, when receiving a video recognition request accompanied by the fingerprint transmitted from video reception device 40 through HTTP transmission/reception unit 21, perform content specifying processing based on video recognition processing using the fingerprint, and return the result (analysis information) to video reception device 40 through HTTP transmission/reception unit 21.

More specifically, retrieving unit 22 receives the video recognition request accompanied by the fingerprint transmitted from video reception device 40, through communication network 16 and HTTP transmission/reception unit 21. Next, retrieving unit 22 cross-checks the received fingerprint and the fingerprints stored in storage unit 23, and retrieves a fingerprint corresponding to the received fingerprint (video recognition processing). Further, retrieving unit 22 specifies the content corresponding to the fingerprint specified based on this retrieval result as content corresponding to the received fingerprint (content specifying processing). Thus, retrieving unit 22 specifies the content corresponding to the received fingerprint. Further, retrieving unit 22 reads the analysis result (analysis information) associated with the specified content from storage unit 23, and returns the read analysis result (analysis information) as the content specifying processing result to video reception device 40 through HTTP transmission/reception unit 21 and communication network 16.

Video reception device 40 includes control unit 41, HTTP transmission/reception unit 42, operation signal reception unit 43, video output unit 44, displaying unit 54, video extraction unit 45, additional information display control unit 46, storage unit 47, video recognition region setting unit 66 and video input unit 48. Video reception device 40 is configured to perform content specifying processing based on video recognition processing using video recognition device 20, obtain analysis information which is the content specifying processing result from video recognition device 20, obtain additional information (e.g. advertisement information) related to the analysis information from additional information distribution device 30, superimpose an image based on the additional information (e.g. the advertisement information related to a video (content) of the received video signals) on the video and display the additional information on displaying unit 54.

HTTP transmission/reception unit 42 is an interface for communication, and is, for example, a communication adapter which is adapted to standards of the Ethernet (registered trademark). HTTP transmission/reception unit 42 is configured to transmit and receive data to and from video recognition device 20 through communication network 16.

Operation signal reception unit 43 is configured to receive an operation signal (an operation signal for video reception device 40) output from an operation unit (not illustrated) such as a remote control device (abbreviated as a "remote controller" below) which has received a user's operation. Operation signal reception unit 43 may be configured to receive a signal output from the remote controller including a gyro sensor based on a physical fluctuation of this remote controller.

Video input unit 48 is a reception circuit and a decoder, and includes reception unit 49 which is configured to receive broadcast signals broadcast from the broadcast station, and input unit 65 which is configured to receive an input of video signals and content related information output from the video transmission device (e.g. STB 14). Video signals received by video input unit 48 include content (e.g. a main program and CMs) switched as time passes.

Reception unit 49 is configured to receive broadcast signals transmitted from broadcast station 12, through an antenna (not illustrated) or the like.

Input unit 65 is an interface which is configured to receive an input of video signals and content related information output from the video transmission device installed outside. Input unit 65 is configured to adapt to, for example, the standards of the HDMI (registered trademark), and can receive video signals and content related information transmitted from the video transmission device through the HDMI (registered trademark). This video transmission device is, for example, STB 14 yet may be a video recording/playback device or the like. Further, the input unit may be configured to receive video signals and content related information transmitted through a video cable and video signals and content related information transmitted by wireless communication.

Video output unit 44 has a function of controlling displaying unit 54, and is configured to control displaying unit 54 based on the video signals input from video input unit 48 and display a video based on the video signals on displaying unit 54. When receiving an input of additional information from control unit 41, video output unit 44 superimposes an image based on the additional information, on the video which is being displayed on displaying unit 54.

Displaying unit 54 is a display which is configured to display a video based on video signals, and is, for example, a LCD (Liquid Crystal Display). However, the present exemplary embodiment is by no means limited to this configuration. Displaying unit 54 may be a PDP (Plasma Display Panel), an OLED (Organic Electro Luminescence Display) or the like.

Additional information display control unit 46 is configured to perform display control of additional information. More specifically, additional information display control unit 46 generates a fingerprint from the partial image extracted by video extraction unit 45, and performs content specifying processing (content specifying processing based on video recognition processing) based on the generated fingerprint using video recognition device 20. This fingerprint is, for example, a hash value of each image which configures a partial video. In this case, additional information display control unit 46 generates a fingerprint of an effective region (a video recognition region or video recognition candidate regions) set by video recognition region setting unit 66). Details of the processing will be described later. Further, additional information display control unit 46 determines whether to display the additional information obtained from additional information distribution device 30, on displaying unit 54 based on the content specifying processing result obtained from video recognition device 20 (whether or not to superimpose the additional information on video signals) or whether to continuously display or hide the additional information which is being displayed on displaying unit 54, and output an instruction based on this determination to control unit 41. Furthermore, additional information display control unit 46 determines on which part of a video which is being displayed on displaying unit 54 an image (or a text) based on the obtained additional information is to be superimposed, based on a video recognition region setting processing result in video recognition region setting unit 66, and outputs an instruction based on this determination to control unit 41.

Video extraction unit 45 is configured to extract a partial video from the video signals input from video input unit 48. Video extraction unit 45 is configured to extract from video signals a partial video of a predetermined period of time which is part of the video signals at a predetermined cycle. When, for example, the predetermined cycle is 3 seconds and a predetermined period of time is 3 seconds, video extraction unit 45 repeats an operation of extracting a partial video of 3 seconds from the video signals every 3 seconds. That is, video extraction unit 45 repeats an operation of continuously extracting a partial video of 3 seconds from the video signals every 3 seconds without a pause. Further, when, for example, the predetermined cycle is 15 seconds and a predetermined period of time is 3 seconds, video extraction unit 45 repeats an operation of extracting a partial video of 3 seconds from the video signals every 15 seconds. That is, video extraction unit 45 repeats an operation of extracting a partial video of 3 seconds from the video signals at intervals of 12 seconds. In addition, a partial video to be extracted from video signals may not be extracted in units of seconds, and, for example, may be extracted in units of a predetermined number of frames based on a video frame rate.

Video recognition region setting unit 66 executes video recognition region setting processing on the partial video extracted by video extraction unit 45. According to the video recognition region setting processing, video recognition region setting unit 66 detects superimposing information such as a caption or an OSD (On Screen Display) superimposed on a partial video, and sets an effective region based on the detection result or feature information included in content related information. The effective region refers to a video recognition region or video recognition candidate regions. That is, video recognition region setting unit 66 sets the video recognition region or the video recognition candidate regions based on the detection result of the superimposing information or the feature information included in the content related information.

An outline of the video recognition region setting processing performed in video recognition region setting unit 66 will be described with reference to FIGS. 3A to 4D.

Figure 3B:
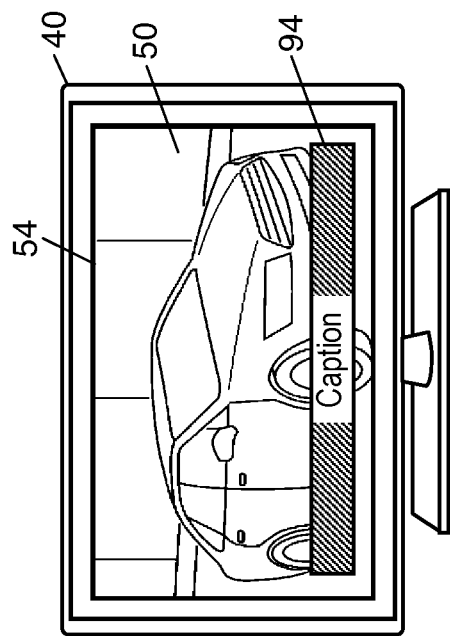
FIG. 3B is a view schematically illustrating another example of a video displayed on the displaying unit of the video reception device according to the first exemplary embodiment.
Figure 3A:
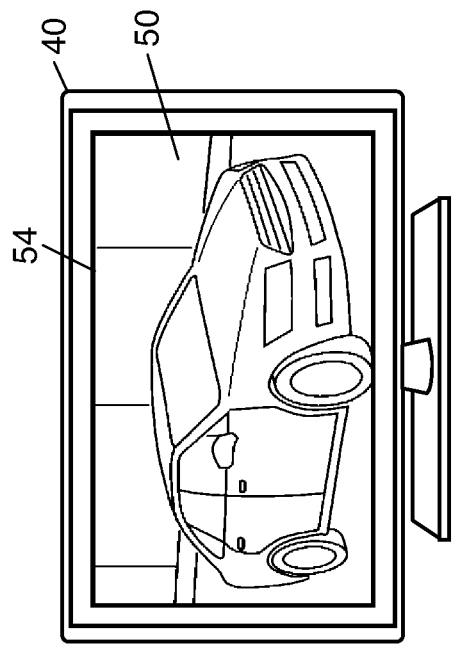
FIG. 3A is a view schematically illustrating an example of a video displayed on a displaying unit of the video reception device according to the first exemplary embodiment.

FIG. 3A is a view schematically illustrating an example of a video displayed on displaying unit 54 of video reception device 40 according to the first exemplary embodiment. FIG. 3B is a view schematically illustrating another example of a video displayed on displaying unit 54 of video reception device 40 according to the first exemplary embodiment.

FIG. 3A illustrates an example where STB 14 outputs video signals received from broadcast station 12 as is to video reception device 40, and video 50 based on the video signals is displayed on displaying unit 54 of video reception device 40.

FIG. 3B illustrates an example where STB 14 superimposes caption 94 on the video signals received from broadcast station 12, outputs the video signals to video reception device 40, and a video (a video obtained by superimposing caption 94 on video 50) based on the video signals is displayed on displaying unit 54.

Some video transmission devices such as STB 14 include a function of, at the video transmission device side, superimposing a caption, an OSD or the like on video signals transmitted from broadcast station 12. In addition, a caption, an OSD or the like superimposed on video signals by the video transmission device will be also referred to as "superimposing information".

When, for example, STB 14 superimposes caption 94 on video signals transmitted from broadcast station 12 and outputs the video signals, displaying unit 54 of video reception device 40 displays a video obtained by superimposing caption 94 on video 50 as illustrated in FIG. 3B.

This caption 94 is superimposed on video 50 by STB 14. Therefore, a video of the same content which video recognition device 20 obtains from broadcast station 12 is video 50 on which caption 94 is not superimposed as illustrated in FIG. 3A.

Thus, when the video transmission device such as STB 14 superimposes superimposing information such as caption 94 on the video signals transmitted from broadcast station 12, the video displayed on displaying unit 54 of video reception device 40 and the video which video recognition device 20 obtains from broadcast station 12 differ in video content even though the content is the same.

Hence, in video reception device 40 according to the present exemplary embodiment, video recognition region setting unit 66 performs video recognition region setting processing, detects a display position and a display size of superimposing information, sets a video recognition region to a region except for the superimposing information or sets a video recognition region based on feature information included in content related information, and generates a fingerprint of this video recognition region.

In addition, video reception device 40 calculates as a fingerprint a hash value of each image which configures a partial video from the video recognition region or video recognition candidate regions.

In addition, caption 94 illustrated in FIG. 3B is only an example of superimposing information. A display position, a display size and the like of the superimposing information are by no means limited to a display position, a display size and the like of caption 94 illustrated in FIG. 3B. Further, the same also applies to captions illustrated in the other figures.

Figure 4C:
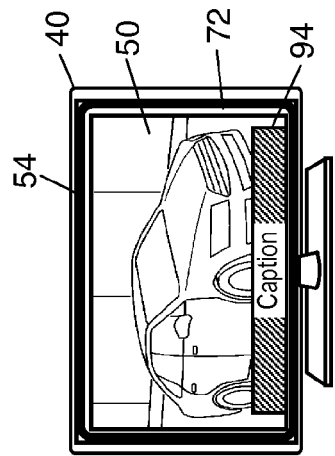
FIG. 4C is a view schematically illustrating an example of the video recognition region set to an entire video in the video reception device.
Figure 4D:
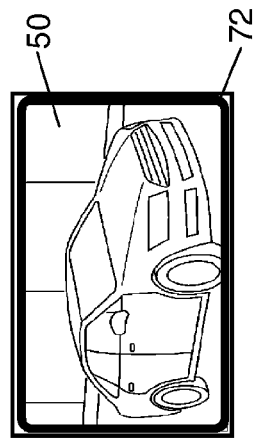
FIG. 4D is a view schematically illustrating an example of the fingerprint generation region set to an entire video in the video recognition device.
Figure 4A:
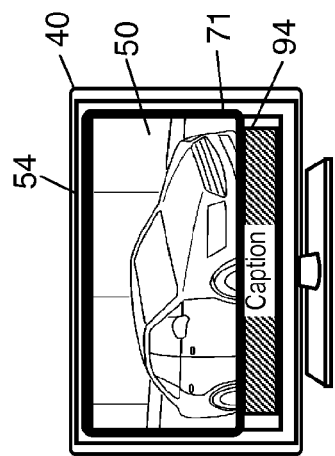
FIG. 4A is a view schematically illustrating an example of a video recognition region set to a video by a video recognition region setting unit of the video reception device according to the first exemplary embodiment.
Figure 4B:
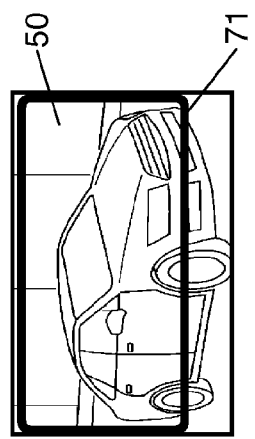
FIG. 4B is a view schematically illustrating an example of a fingerprint generation region set to the video recognition region set by the video recognition region setting unit in the video recognition device according to the first exemplary embodiment.

FIG. 4A is a view schematically illustrating an example of video recognition region 71 set to video 50 by video recognition region setting unit 66 of video reception device 40 according to the first exemplary embodiment. FIG. 4B is a view schematically illustrating an example of a fingerprint generation region set based on video recognition region 71 set by video recognition region setting unit 66 in video recognition device 20 according to the first exemplary embodiment. FIG. 4C is a view schematically illustrating an example of video recognition region 72 set to entire video 50 in video reception device 40. FIG. 4D is a view schematically illustrating an example of the fingerprint generation region set to entire video 50 in video recognition device 20.

In addition, FIGS. 4A to 4D illustrate video recognition regions 71 and 72 which are fingerprint generation regions by bold lines for ease of description. However, these bold lines are not actually displayed on displaying unit 54.

FIG. 4A illustrates an example where STB 14 superimposes on video 50 caption 94 which is an example of superimposing information and video recognition region setting unit 66 sets video recognition region 71 to a region except for caption 94. FIG. 4C illustrates an example where, even though STB 14 superimposes caption 94 on video 50, video recognition region 72 is set to a region (entire video 50) including caption 94. In this case, caption 94 is not superimposed on video 50 which video recognition device 20 obtains from broadcast station 12 as illustrated in FIGS. 4B and 4D.

In addition, FIG. 4C is provided to show a contrast to an operation example illustrated in FIG. 4A, and does not illustrate that video recognition region setting unit 66 sets a video recognition region to entire video 50 even though superimposing information such as caption 94 is detected.

As illustrated in, for example, FIG. 4C, in video reception device 40, when video recognition region 72 is set to a region including caption 94, additional information display control unit 46 generates a fingerprint of the region including caption 94. In this case, video recognition device 20 generates a fingerprint of video recognition region 72 of video 50 as illustrated in FIG. 4D. There is no caption 94 in this region. Therefore, the fingerprint generated by video reception device 40 and the fingerprint generated by video recognition device 20 do not match, and video recognition device 20 is likely to fail in content specifying processing.

Hence, in video reception device 40 according to the present exemplary embodiment, as illustrated in FIG. 4A, video recognition region setting unit 66 detects a display region (referred to as a "superimposing region" below) of superimposing information such as caption 94 or specifies the superimposing region of the superimposing information based on the feature information included in the content related information, and sets video recognition region 71 to a region except for the superimposing region. Further, additional information display control unit 46 of video reception device 40 generates a fingerprint of video recognition region 71 except for the superimposing region. Video recognition device 20 generates a fingerprint of same video recognition region 71 as that of video reception device 40 as illustrated in FIG. 4B. Consequently, the fingerprint generated by video reception device 40 and the fingerprint generated by video recognition device 20 are relatively highly likely to match. Video recognition device 20 is relatively highly likely to succeed in content specifying processing compared to the examples illustrated in FIGS. 4C and 4D.

Details of the video recognition region setting processing will be described later.

In addition, as illustrated in FIGS. 4B and 4D, a region whose fingerprint is to be generated by video recognition device 20 is set based on the video recognition region set by video recognition region setting unit 66.

Video reception device 40 may be configured to transmit information indicating the video recognition region set by video recognition region setting unit 66 together with, for example, a fingerprint to video recognition device 20.

Storage unit 47 is a storage device which is configured by, for example, a non-volatile memory. Storage unit 47 stores, for example, program meta information such as an electronic program guide (EPG) received by video input unit 48, and the additional information and the display control information of the additional information obtained from additional information distribution device 30 through HTTP transmission/reception unit 42. The display control information of the additional information is information used to perform display control of the additional information, and includes, for example, information indicating a display period of the additional information.

Control unit 41 is configured to control each circuit block included in video reception device 40. Control unit 41 employs a configuration including, for example, a non-volatile memory such as a ROM which stores programs (e.g. applications), a CPU which executes the programs, and a volatile memory such as a RAM which temporarily stores data, parameters and the like when the CPU executes a program.

Control unit 41 performs, for example, the following control. Control unit 41 obtains content related information input together with video signals. Further, control unit 41 controls video extraction unit 45 such that video extraction unit 45 extracts a partial video from video signals at predetermined cycles. Furthermore, control unit 41 controls each circuit block such that, every time video extraction unit 45 extracts a partial video, video recognition region setting unit 66 sets a video recognition region to the partial video based on feature information included in content related information, and additional information display control unit 46 generates (calculates) a fingerprint of the extracted partial video from the video recognition region. Still further, control unit 41 controls each circuit block to transmit the fingerprint together with a video recognition request to video recognition device 20 through HTTP transmission/reception unit 42 and communication network 16, and request video recognition device 20 to perform content specifying processing (content specifying processing based on the video recognition processing) on this fingerprint. Moreover, control unit 41 controls each circuit block to obtain the content specifying processing result (analysis information) of this fingerprint from video recognition device 20 through communication network 16 and HTTP transmission/reception unit 42, and obtain additional information based on the content specifying processing result (analysis information) from additional information distribution device 30 through communication network 16 and HTTP transmission/reception unit 42. Besides, control unit 41 controls each circuit block to store the obtained additional information in storage unit 47, output the additional information to video output unit 44, superimpose the additional information on a video which is being displayed on displaying unit 54 and display the additional information. In this case, control unit 41 controls each circuit block to hide the additional information which is being displayed on displaying unit 54 when additional information display control unit 46 determines to "hide the additional information".

In addition, additional information display system 10 may be configured such that, when video reception device 40 requests video recognition device 20 to perform content specifying processing based on video recognition processing, video reception device 40 creates a signal (data) indicating a content specifying processing request, and transmits this signal as the video recognition request to video recognition device 20. However, a rule may be set between video reception device 40 and video recognition device 20 such that transmitting a fingerprint from video reception device 40 to video recognition device 20 is to request video recognition device 20 to perform content specifying processing based on video recognition processing instead of transmitting such a signal (data).

[1-2. Operation]

An operation of additional information display system 10 configured as described above will be described with reference to FIGS. 5 to 13.

As described above, when receiving an input of video signals output from the video transmission device such as STB 14, video reception device 40 performs content specifying processing on the video signals using video recognition device 20. Further, video reception device 40 obtains additional information 51 (e.g. advertisement information) related to the content specifying processing result from additional information distribution device 30, superimposes obtained additional information 51 on these video signals and displays the additional information on displaying unit 54. Furthermore, video reception device 40 displays or hides obtained additional information 51 (e.g. advertisement information) according to display control information of the additional information obtained together with this additional information 51.

In this case, video reception device 40 generates from a partial video a fingerprint which is used for content specifying processing, and whose video recognition region is set by video recognition region setting unit 66 based on the feature information included in the content related information or whose video recognition region or video recognition candidate regions are set by video recognition region setting unit 66 by performing video recognition region setting processing.

The outline of this content specifying processing will be described below.

[1-2-1. Operation of Content Specifying Processing]

Figure 5:
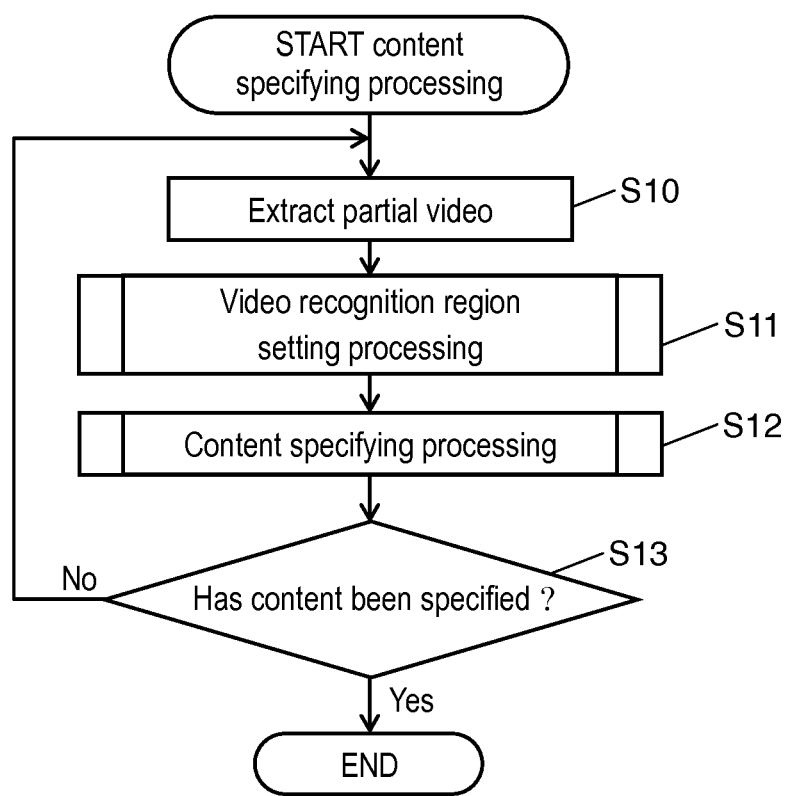
FIG. 5 is a flowchart schematically illustrating an operation of content specifying processing performed by the video reception device according to the first exemplary embodiment.

FIG. 5 is a flowchart schematically illustrating an operation of content specifying processing performed by video reception device 40 according to the first exemplary embodiment.

Video extraction unit 45 of video reception device 40 extracts a partial video from video signals output from STB 14 and input to input unit 65 (step S10).

Video recognition region setting unit 66 performs video recognition region setting processing (step S11).

The video recognition region setting processing refers to processing of, at video recognition region setting unit 66, setting a video recognition region based on feature information included in content related information, or processing of detecting a region (superimposing region) on which superimposing information is displayed from a partial video extracted by video extraction unit 45, and setting a video recognition region or video recognition candidate regions to a region except for a superimposing region. Details of the video recognition region setting processing will be described later.

Additional information display control unit 46 performs the following content specifying processing (step S12). Additional information display control unit 46 generates a fingerprint based on the partial video extracted by video extraction unit 45, and the video recognition region or the video recognition candidate regions set by video recognition region setting unit 66. The generated fingerprint is transmitted to video recognition device 20 through HTTP transmission/reception unit 42 according to an instruction of control unit 41. Video recognition device 20 performs content specifying processing based on video recognition processing using this fingerprint, and transmits analysis information (a content specifying processing result) related to specified content, to video reception device 40 through communication network 16. In this case, when the content specifying processing fails, for example, video recognition device 20 may perform an operation of transmitting particular information such as "NG" or "0" as the analysis information to video reception device 40. Control unit 41 controls each circuit block to receive the analysis information (the content specifying processing result) transmitted from video recognition device 20, and transfer the analysis information to additional information display control unit 46. Further, this analysis information is stored in storage unit 47. Details of the content specifying processing will be described later.

Additional information display control unit 46 determines whether or not the content specifying processing has succeeded (whether or not content has been specified from the fingerprint) based on the obtained analysis information (step S13).

When it is determined in step S13 that the content specifying processing has succeeded (Yes), control unit 41 controls each circuit block to transmit the analysis information received from video recognition device 20 to additional information distribution device 30 through HTTP transmission/reception unit 42 and communication network 16 according to an instruction from additional information display control unit 46. Additional information distribution device 30 transmits additional information related to the received analysis information to video reception device 40 through communication network 16. Control unit 41 controls each circuit block to receive the additional information transmitted from additional information distribution device 30, through HTTP transmission/reception unit 42. Further, control unit 41 controls each circuit block to transfer the received additional information to video output unit 44, superimpose this additional information on a video which is being displayed on displaying unit 54 according to the instruction from additional information display control unit 46, and display the additional information. Then, a series of processing is finished.

In addition, each device may be configured such that a URL is included in analysis information obtained from video recognition device 20, and control unit 41 accesses additional information distribution device 30 by specifying this URL and obtains the information related to the URL as additional information related to the analysis information from additional information distribution device 30.

When it is determined in step S13 that the content specifying processing has failed (No), video reception device 40 repeats processing of above step S10 to step S13 on a next partial video.

In addition, additional information display control unit 46 may be configured to, when, for example, video recognition device 20 returns the same analysis result (content specifying processing result) to a predetermined number of (e.g. 3) continuous partial videos, determine that the content specifying processing has succeeded in step S13.

Video reception device 40 repeats a series of these operations.

Next, the video recognition region setting processing in step S11 will be described.

[1-2-2. Operation of Video Recognition Region Setting Processing]

In the present exemplary embodiment, video reception device 40 performs video recognition region setting processing to increase precision of content specifying processing with respect to video signals input from input unit 65. Hence, video reception device 40 checks features of the video signals.

Hereinafter, the video recognition region setting processing when superimposing information such as caption 94 is superimposed on video signals by the video transmission device such as STB 14 and is input to video reception device 40 will be described.

An outline of the video recognition region setting processing is as follows.

Video reception device 40 first detects whether or not content related information including feature information (e.g. feature information indicating whether or not there is caption 94, a display position and a display size of caption 94, a transmission method of 3D video signals and the like) is input together with video signals to video reception device 40 through input unit 65. When receiving an input of the feature information, video reception device 40 sets a video recognition region using these pieces of information, generates a fingerprint of this video recognition region and performs the content specifying processing.

When video reception device 40 does not receive an input of the feature information since, for example, the feature information is not included in the content related information or there is not the content related information, video reception device 40 performs an operation of detecting features (e.g. whether or not there is caption 94, a display position or a display size of caption 94 and the like) of video signals from the video signals themselves. Subsequently, video reception device 40 performs content specifying processing based on this detection result.

Figure 6:
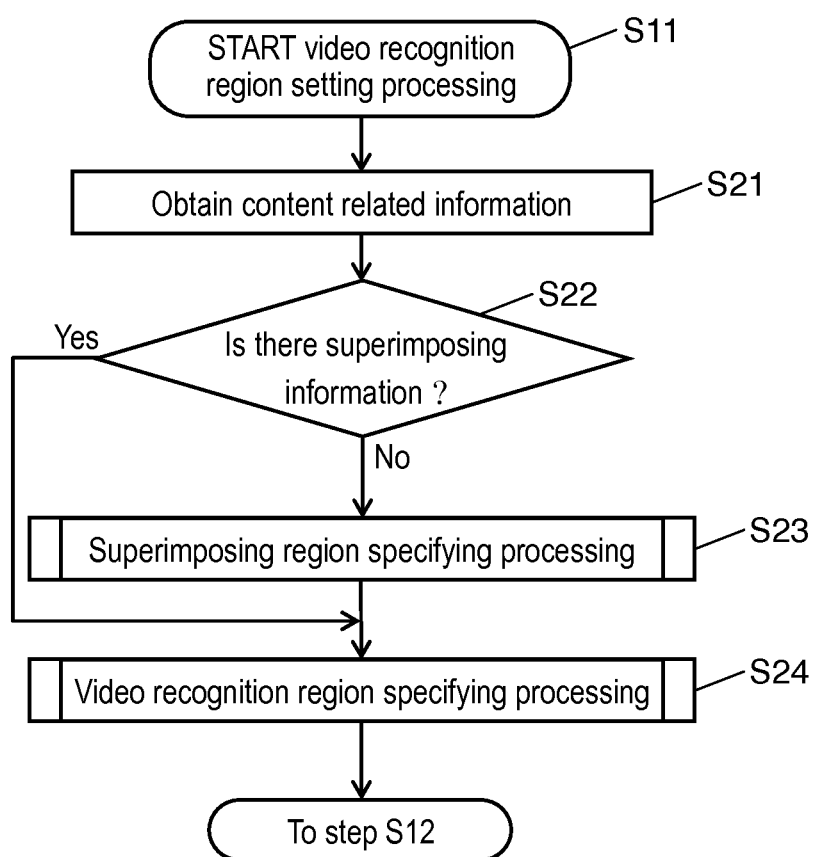
FIG. 6 is a flowchart schematically illustrating an operation of video recognition region setting processing performed by the video reception device according to the first exemplary embodiment.

FIG. 6 is a flowchart schematically illustrating an operation of the video recognition region setting processing performed by video reception device 40 according to the first exemplary embodiment.

Video recognition region setting unit 66 of video reception device 40 first obtains content related information related to the video signals input from STB 14 to video reception device 40 through input unit 65 (step S21).

Next, video recognition region setting unit 66 checks whether or not the content related information includes feature information (information indicating, for example, a display position and a display size which will be referred to as "superimposing region information" below) related to a display region of superimposing information such as caption 94 and an OSD (step S22).

When it is determined in step S22 that the content related information does not include the superimposing region information, there is not the content related information or the feature information included in the content related information is feature information related to a 3D video (No), video recognition region setting unit 66 performs superimposing region specifying processing (step S23).

Superimposing region specifying processing refers to processing of detecting caption 94, the OSD or the like (superimposing information) from video signals input to video reception device 40 through input unit 65, and specifying a display position and a display size (superimposing region) of these pieces of superimposing information. Details of the superimposing region specifying processing will be described later.

Video recognition region setting unit 66 performs the video recognition region specifying processing using information (superimposing region information) of the superimposing region specified in the superimposing region specifying processing in step S23 (step S24).

The video recognition region specifying processing refers to processing of specifying a video recognition region or video recognition candidate regions using superimposing region information. Details of the video recognition region specifying processing will be described later.

When the superimposing region information is detected from the content related information in step S22 (Yes), video recognition region setting unit 66 performs the video recognition region specifying processing using the superimposing region information (step S24).

After the video recognition region setting processing in step S24 is finished, the flow moves to step S12 in FIG. 5.

In addition, when content related information includes superimposing region information, video recognition region setting unit 66 can relatively precisely learn a display position, a display size or the like of superimposing information such as caption 94. Consequently, it is possible to skip the superimposing region specifying processing in step S23. Further, when video signals of a 3D video are input to video reception device 40 from the video transmission device such as STB 14, video recognition region setting unit 66 can adequately set a video recognition region based on a transmission method of the 3D video signals. Consequently, it is possible to more quickly and more precisely perform content specifying processing (content specifying processing based on video recognition region specifying processing) and obtain additional information.

Next, the superimposing region specifying processing in step S23 when content related information does not include superimposing region information or content related information is not input to video reception device 40 will be described.

[1-2-3. Operation of Superimposing Region Specifying Processing]

Figure 7:
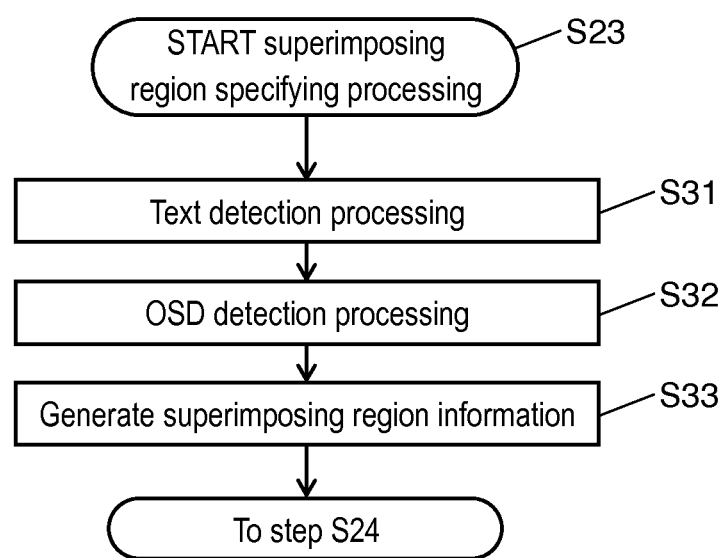
FIG. 7 is a flowchart schematically illustrating an operation of superimposing region specifying processing performed by the video reception device according to the first exemplary embodiment.

FIG. 7 is a flowchart schematically illustrating an operation of superimposing region specifying processing performed by video reception device 40 according to the first exemplary embodiment.

Video recognition region setting unit 66 executes text detection processing on a partial video extracted by video extraction unit 45 (step S31).

For the text detection processing, for example, a generally known OCR (Optical Character Reader) can be used as a text detecting method.

Next, video recognition region setting unit 66 performs OSD detection processing using pattern matching processing (step S32). The OSD detection processing refers to processing of detecting an OSD display region (a display position and a display size). Further, this pattern matching processing refers to, for example, processing using a pattern matching method of storing in advance an OSD image of STB 14 as a template image in storage unit 47, comparing a partial video and a template image, and searching for whether or not the template image (OSD image) is included in the partial video.

Video recognition region setting unit 66 uses as a superimposing region a region (a region in which caption 94 is displayed) in which a text is detected when the text is detected in the text detection processing in step S31, and a region (a region in which an OSD image is displayed) in which the OSD is detected when the OSD is detected in the OSD detection processing in step S32, and generates superimposing region information indicating a display position and a display size of the superimposing region (step S33). Subsequently, the flow moves to step S24 in FIG. 6.

In addition, video reception device 40 may be configured to perform one of the text detection processing in step S31 and the pattern matching processing in step S32.

Next, the video recognition region specifying processing in step S24 will be described.

[1-2-4. Operation of Video Recognition Region Specifying Processing]

Figure 8:
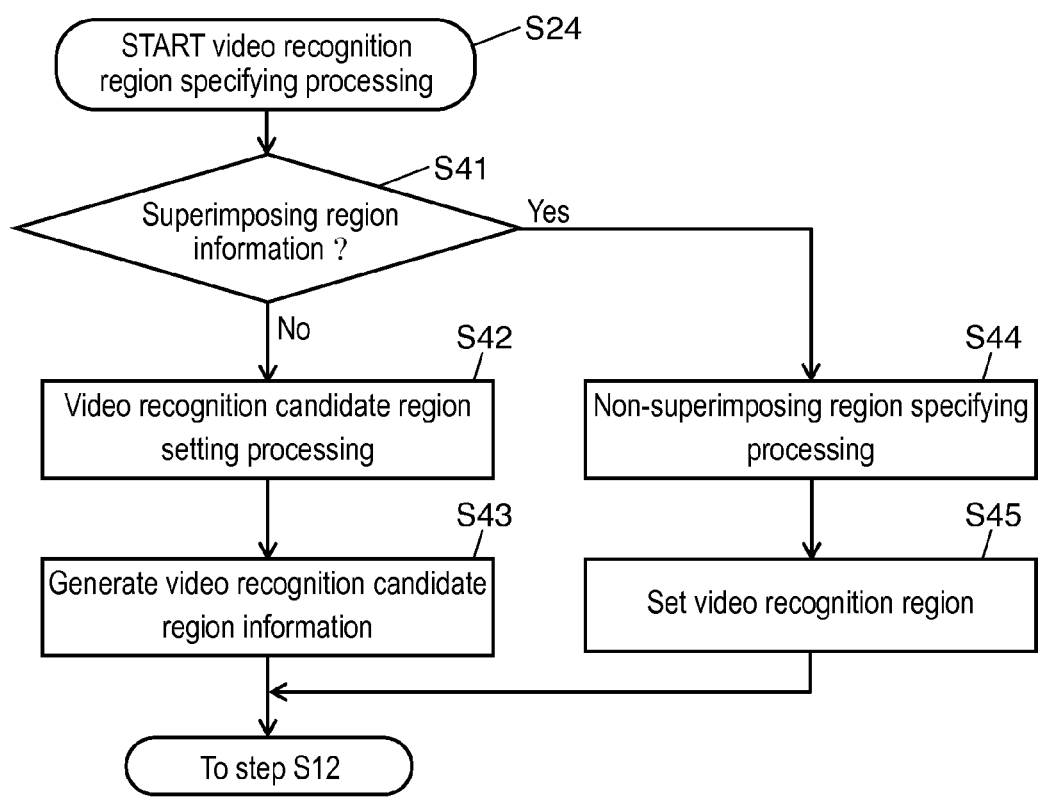
FIG. 8 is a flowchart schematically illustrating an operation of video recognition region specifying processing performed by the video reception device according to the first exemplary embodiment.

FIG. 8 is a flowchart schematically illustrating an operation of video recognition region specifying processing performed by video reception device 40 according to the first exemplary embodiment.

Video recognition region setting unit 66 determines whether or not the superimposing region information has been obtained or specified in step S22 or step S23 (step S41).

When it is determined in step S41 that the superimposing region information has been obtained or specified (Yes), video recognition region setting unit 66 performs non-superimposing region specifying processing based on the superimposing region information included in the content related information obtained in step S22 or the superimposing region information specified in step S23 (step S44).

The non-superimposing region specifying processing refers to processing of specifying a region (referred to as a "non-superimposing region" below) except for a superimposing region by specifying a superimposing region in a partial video based on superimposing region information. Details of the non-superimposing region specifying processing will be described later.

Video recognition region setting unit 66 sets a video recognition region to a non-superimposing region specified in the non-superimposing region specifying processing in step S44. Further, video recognition region setting unit 66 generates information indicating the video recognition region, and outputs the information to additional information display control unit 46 (step S45). Subsequently, the flow moves to step S12 in FIG. 5.

In addition, the information indicating the video recognition region generated in step S45 is transmitted together with a fingerprint from video reception device 40 to video recognition device 20.

In addition, a video recognition region may match with a non-superimposing region or may be part of the non-superimposing region. That is, the video recognition region may be set to an entire video region (a video region of a partial video) except for a superimposing region, or may be set to part of the video region except for the superimposing region. A video recognition region is desirably set adequately according to precision of content specifying processing, a specification of video reception device 40 or the like.

When it is determined in step S41 that the superimposing region information has neither been obtained nor specified (No), video recognition region setting unit 66 performs the video recognition candidate region setting processing (step S42).

The video recognition candidate region setting processing refers to processing of dividing a partial video into a plurality of regions. The partial video divided by the video recognition candidate region setting processing will be also referred to as "video recognition candidate regions" below. The video recognition candidate region setting processing is performed for the following reason. When it is determined in step S41 that the superimposing region information has neither been obtained nor specified, video reception device 40 has difficulty in determining whether the superimposing region information can neither be obtained nor specified since superimposing information is not superimposed on video signals, or the superimposing region information can neither be obtained nor specified even though the superimposing information is superimposed on video signals.

Hence, video reception device 40 according to the present exemplary embodiment generates a fingerprint of each region (each video recognition candidate region) by dividing a partial video into a plurality of regions, and performs content specifying processing for each of the regions. It is because, even when superimposing information is superimposed on video signals, as long as a partial video is divided into a plurality of regions and classified into regions on which the superimposing information is superimposed and regions on which the superimposing information is not superimposed, even though content specifying processing is likely to fail with respect to the regions (video recognition candidate regions on which the superimposing information is superimposed) on which the superimposing information is superimposed, it is possible to relatively increase a likelihood that content specifying processing succeeds with respect to regions (video recognition candidate regions on which superimposing information is not superimposed) on which the superimposing information is not superimposed. Details of the video recognition candidate region setting processing will be described later.

Video recognition region setting unit 66 generates information indicating the video recognition candidate region set in the video recognition candidate region setting processing in step S42, and outputs the information to additional information display control unit 46 (step S43). Subsequently, the flow moves to step S12 in FIG. 5.

In addition, the information indicating the video recognition candidate region generated in step S43 is transmitted together with a fingerprint from video reception device 40 to video recognition device 20.

Next, the non-superimposing region specifying processing in step S44 will be described with reference to FIGS. 9A to 11C.

[1-2-5. Operation of Non-Superimposing Region Specifying Processing]

Hereinafter, an operation of video reception device 40 when content related information including superimposing region information is input together with video signals to video reception device 40, and an operation of video reception device 40 when superimposing region information is detected from video signals since content related information does not include superimposing region information (or there is not the content related information) will be described.

First, the operation of video reception device 40 when the content related information including the superimposing region information is input together with the video signals to video reception device 40 will be described.

Figure 9A:
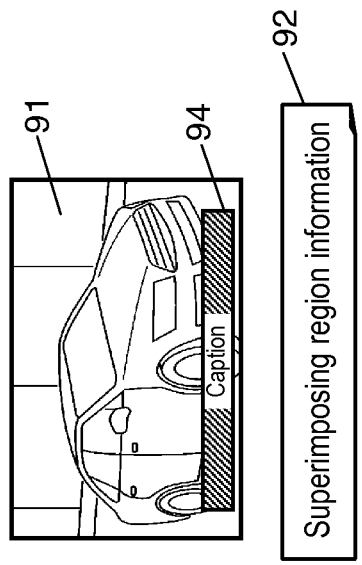
FIG. 9A is a view schematically illustrating an example of video signals and superimposing region information output from a video transmission device and input to the video reception device.
Figure 9B:
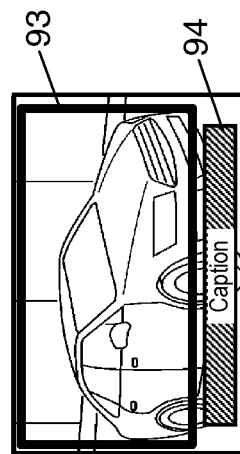
FIG. 9B is a view schematically illustrating an example of a video recognition region set by the video recognition region setting unit of the video reception device according to the first exemplary embodiment.
Figure 9C:
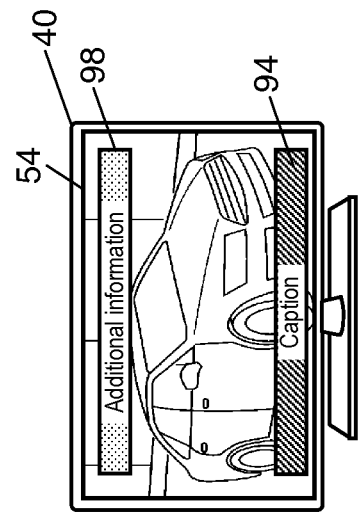
FIG. 9C is a view schematically illustrating an example of a display position of additional information displayed on the displaying unit of the video reception device according to the first exemplary embodiment.

FIG. 9A is a view schematically illustrating an example of video signals 91 and superimposing region information 92 output from the video transmission device and input to video reception device 40. FIG. 9B is a view schematically illustrating an example of video recognition region 93 set by video recognition region setting unit 66 of video reception device 40 according to the first exemplary embodiment. FIG. 9C is a view schematically illustrating an example of a display position of additional information 98 displayed on displaying unit 54 of video reception device 40 according to the first exemplary embodiment.

In addition, video reception device 40 may obtain the content related information through, for example, communication network 16.

It is assumed that, as schematically illustrated in, for example, FIG. 9A, video signals 91 on which caption 94 is superimposed at a STB 14 side on video signals broadcast from broadcast station 12, and content related information including superimposing region information 92 of caption 94 are input from STB 14 to video reception device 40.

In such a case, video recognition region setting unit 66 specifies a superimposing region (e.g. a display region of caption 94) based on obtained superimposing region information 92. Further, video recognition region setting unit 66 specifies as a non-superimposing region a region (e.g. a region except for caption 94) except for this superimposing region (the non-superimposing region specifying processing in step S44).

Furthermore, video recognition region setting unit 66 sets video recognition region 93 to a non-superimposing region as illustrated in FIG. 9B (step S45). Additional information display control unit 46 generates the fingerprint of video recognition region 93. Further, additional information display control unit 46 instructs control unit 41 to transmit the generated fingerprint and information indicating video recognition region 93 to video recognition device 20, and performs content specifying processing on video recognition region 93 (step S12).

In addition, when content related information includes feature information indicating that a caption is superimposed on video signals broadcast from broadcast station 12, video recognition region setting unit 66 may set a video recognition region to a region except for the caption, and generate a fingerprint. However, video recognition device 20 also obtains from broadcast station 12 video signals on which this caption is superimposed, and may set a video recognition region to a region including this caption and generate a fingerprint.

In addition, video recognition device 20 generates a fingerprint based on the information indicating video recognition region 93 obtained from video reception device 40, and performs content specifying processing.

In addition, FIG. 9B illustrates video recognition region 93 by a bold line for ease of description. However, this bold line is not actually displayed on displaying unit 54 of video reception device 40.

Further, additional information display control unit 46 instructs control unit 41 to display, on displaying unit 54, additional information 98 obtained from additional information distribution device 30 based on the content specifying processing. In this case, additional information display control unit 46 determines a display position of additional information 98 based on the non-superimposing region specified by video recognition region setting unit 66. That is, additional information display control unit 46 sets the display position of additional information 98 to the non-superimposing region such that additional information 98 does not overlap superimposing information such as caption 94. Further, additional information display control unit 46 instructs control unit 41 to display additional information 98 at the set position. In response to the instruction, control unit 41 controls video output unit 44 or the like to display additional information 98 at a position instructed by additional information display control unit 46. In the example illustrated in FIG. 9C, additional information display control unit 46 displays additional information 98 at an upper portion of displaying unit 54 at which additional information 98 does not overlap caption 94.

In addition, when it is determined in step S22 that the feature information included in the content related information is feature information related to a 3D video, video recognition region setting unit 66 sets a video recognition region to a partial video according to the transmission method of this 3D video signals, and the flow subsequently moves to step S23 to perform superimposing region specifying processing. Further, a video recognition region whose fingerprint is to be generated is set to a region except for the superimposing region specified in step S23 from the video recognition region set according to the transmission method of 3D video signals.

An example of a video recognition region set according to a transmission method of 3D video signals will be described.

FIG. 9D is a view schematically illustrating an example of video signals 91L and 91R of a 3D video output from the video transmission device and input to video reception device 40. FIG. 9E is a view schematically illustrating an example of video recognition regions 93L and 93R set to 3D video signals by video recognition region setting unit 66 of video reception device 40 according to the first exemplary embodiment.

It is assumed that, as illustrated in, for example, FIG. 9D, video signals of a 3D video of the side-by-side method in which video signal 91L for a left eye is arranged on a left half of one screen and video signal 91R for a right eye is arranged on a right half of one screen, and content related information including 3D video information 92LR indicating that the video signals are a 3D video based on the side-by-side method are input from STB 14 to video reception device 40.

In such a case, video recognition region setting unit 66 sets video recognition region 93L to video signal 91L for the left eye and video recognition region 93R to video signal 91R for the right eye as illustrated in, for example, FIG. 9E based on 3D video information 92LR.

In addition, FIGS. 9D and 9E illustrate video recognition regions 93L and 93R by bold lines for ease of description. However, these bold lines are not actually displayed on displaying unit 54 of video reception device 40.

Next, an operation of video reception device 40 when superimposing region information related to caption 194 is not output from STB 14 and only video signals on which caption 194 is superimposed are input to video reception device 40 will be described.

In this regard, an operation of video recognition region setting unit 66 varies depending on whether or not a display position and a display position of superimposing information can be detected from video signals. First, an operation when the display position and the display size of the superimposing information can be detected from video signals will be described.

Figure 10A:
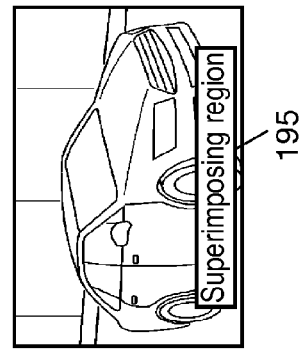
FIG. 10A is a view schematically illustrating an example of video signals 191 output from the video transmission device and input to the video reception device.
Figure 10B:
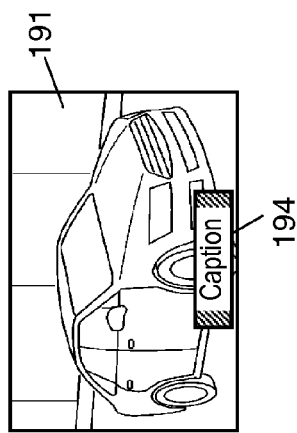
FIG. 10B is a view schematically illustrating an example of a superimposing region set by the video recognition region setting unit of the video reception device according to the first exemplary embodiment.
Figure 10C:
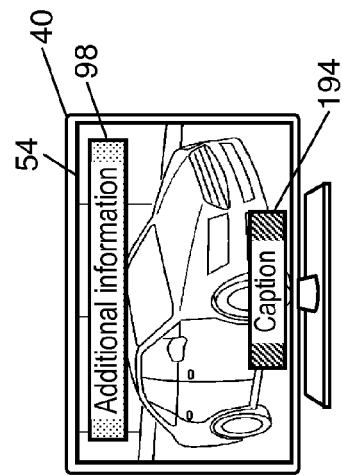
FIG. 10C is a view schematically illustrating an example of a video recognition region set by the video recognition region setting unit of the video reception device according to the first exemplary embodiment.
Figure 10D:
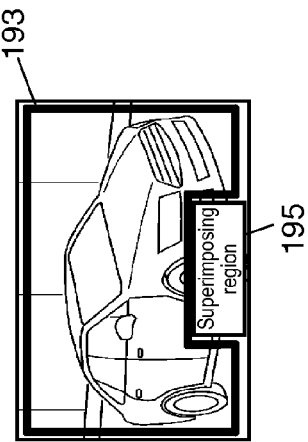
FIG. 10D is a view schematically illustrating an example of a display position of additional information displayed on the displaying unit of the video reception device according to the first exemplary embodiment.

FIG. 10A is a view schematically illustrating an example of video signals 191 output from the video transmission device and input to video reception device 40. FIG. 10B is a view schematically illustrating an example of superimposing region 195 set by video recognition region setting unit 66 of video reception device 40 according to the first exemplary embodiment. FIG. 10C is a view schematically illustrating an example of video recognition region 193 set by video recognition region setting unit 66 of video reception device 40 according to the first exemplary embodiment. FIG. 10D is a view schematically illustrating an example of a display position of additional information 98 displayed on displaying unit 54 of video reception device 40 according to the first exemplary embodiment.

When, for example, as illustrated in FIG. 10A, even though caption 194 is superimposed on video signals 191 input from STB 14 to video reception device 40, superimposing region information related to this caption 194 is not output from STB 14, video recognition region setting unit 66 detects the display position and the display size of caption 194 from video signals 191, and specifies superimposing region 195 based on the detection result as illustrated in FIG. 10B (superimposing region specifying processing in step S23).

Further, video recognition region setting unit 66 specifies as a non-superimposing region a region (i.e., a region except for caption 194) except for superimposing region 195 (the non-superimposing region specifying processing in step S44).

Furthermore, video recognition region setting unit 66 sets video recognition region 193 to a non-superimposing region as illustrated in FIG. 10C (step S45). Additional information display control unit 46 generates the fingerprint of video recognition region 193. Further, additional information display control unit 46 instructs control unit 41 to transmit the generated fingerprint and information indicating video recognition region 193 to video recognition device 20, and performs content specifying processing on video recognition region 193 (step S12).

In addition, when it is determined based on the content related information that a caption is superimposed on video signals broadcast from broadcast station 12, video reception device 40 may set a video recognition region to a region except for the caption, and generate a fingerprint. However, video recognition device 20 also obtains video signals on which this caption is superimposed, and video reception device 40 may generate a fingerprint of a region including this caption.

In addition, video recognition device 20 generates a fingerprint based on information indicating video recognition region 193 obtained from video reception device 40, and performs content specifying processing.

In addition, FIG. 10C illustrates video recognition region 193 by a bold line for ease of description. However, this bold line is not actually displayed on displaying unit 54 of video reception device 40. Further, for ease for description, FIGS. 10B and 10C illustrate superimposing region 195. However, this superimposing region 195 is not displayed on displaying unit 54.

Further, additional information display control unit 46 instructs control unit 41 to display, on displaying unit 54, additional information 98 obtained from additional information distribution device 30 based on the content specifying processing. In this regard, additional information display control unit 46 sets a display position of additional information 98 to the non-superimposing region specified by video recognition region setting unit 66 such that additional information 98 does not overlap caption 194, and gives control unit 41 an instruction about the display position. In response to the instruction, control unit 41 controls video output unit 44 or the like to display additional information 98 at an upper portion of displaying unit 54 which is instructed by additional information display control unit 46 and at which additional information 98 does not overlap caption 194 as illustrated in, for example, FIG. 10D.

Next, an operation when the display position and the display size of the superimposing information cannot be detected from video signals will be described. In this case, video reception device 40 performs the video recognition candidate region setting processing in step S42. The video recognition candidate region setting processing is as follows.

[1-2-6. Operation of Video Recognition Candidate Region Setting Processing]

Figure 11C:
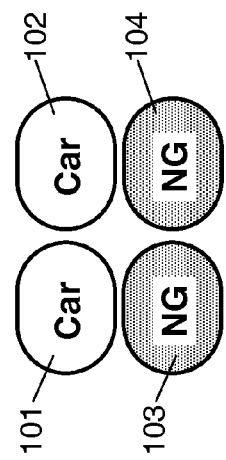
FIG. 11C is a view schematically illustrating an example of a content specifying processing result obtained from the video recognition device by the video reception device according to the first exemplary embodiment.
Figure 11D:
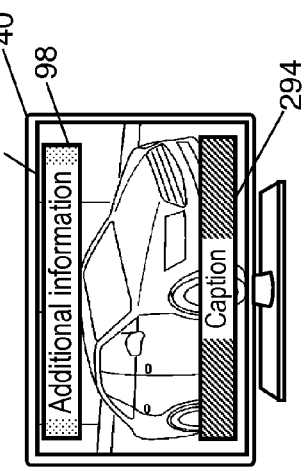
FIG. 11D is a view schematically illustrating an example of a display position of additional information displayed on the displaying unit of the video reception device according to the first exemplary embodiment.
Figure 11A:
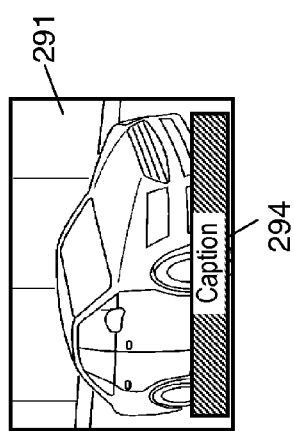
FIG. 11A is a view schematically illustrating an example of video signals output from the video transmission device and input to the video reception device.
Figure 11B:
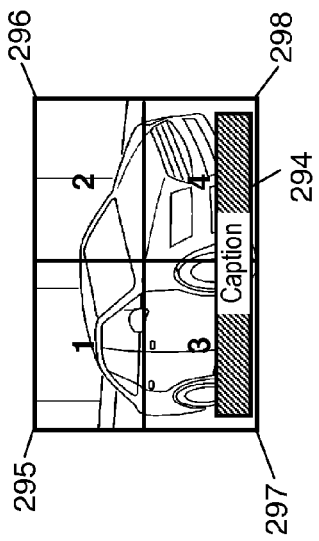
FIG. 11B is a view schematically illustrating an example of video recognition candidate regions set by the video recognition region setting unit of the video reception device according to the first exemplary embodiment.

FIG. 11A is a view schematically illustrating an example of video signals 291 output from the video transmission device and input to video reception device 40. FIG. 11B is a view schematically illustrating an example of video recognition candidate regions 295 to 298 set by video recognition region setting unit 66 of video reception device 40 according to the first exemplary embodiment. FIG. 11C is a view schematically illustrating an example of a content specifying processing result obtained from video recognition device 20 by video reception device 40 according to the first exemplary embodiment. FIG. 11D is a view schematically illustrating an example of a display position of additional information 98 displayed on displaying unit 54 of video reception device 40 according to the first exemplary embodiment.

When, for example, as illustrated in FIG. 11A, even though caption 294 is superimposed on video signals 291 input from STB 14 to video reception device 40, superimposing region information related to this caption 294 is not output from STB 14, and, when video recognition region setting unit 66 cannot detect the display position and the display size of caption 294 from video signals 291, video recognition region setting unit 66 divides a video into a plurality of video recognition candidate regions (the video recognition candidate region setting processing in step S42).

FIG. 11B illustrates an example where video recognition region setting unit 66 divides a partial video into four video recognition candidate regions 295, 296, 297 and 298.

In addition, FIG. 11B illustrates video recognition candidate regions 295 to 298 by bold lines for ease of description. However, these bold lines are not actually displayed on displaying unit 54 of video reception device 40.

Further, additional information display control unit 46 generates a fingerprint for each of a plurality of video recognition candidate regions (four video recognition candidate regions 295 to 298 in the example illustrated in FIG. 11B). Further, additional information display control unit 46 instructs control unit 41 to transmit information (information indicating four video recognition candidate regions 295 to 298 in the example illustrated in FIG. 11B) indicating a plurality of generated fingerprints and video recognition candidate regions to video recognition device 20, and performs content specifying processing on the plurality of video recognition candidate regions (four video recognition candidate regions 295 to 298 in the example illustrated in FIG. 11B) (step S12).

In the example illustrated in FIG. 11B, caption 294 is included in two regions of video recognition candidate regions 297 and 298, and caption 294 is not included in two regions of video recognition candidate regions 295 and 296. Hence, the content specifying processing with respect to the two regions of video recognition candidate regions 295 and 296 is more highly likely to succeed than in video recognition candidate regions 297 and 298.

FIG. 11C illustrates an example where video recognition device 20 performs content specifying processing (content specifying processing based on video recognition processing) using a fingerprint generated for each region of video recognition candidate regions 295 to 298, succeeds in the content specifying processing with respect to video recognition candidate regions 295 and 296 and returns analysis information 101 and 102 indicating "Car" as the content specifying processing results to video reception device 40, and fails in the content specifying processing with respect to video recognition candidate regions 297 and 298 and returns analysis information 103 and 104 indicating "NG" as the content specifying processing results to video reception device 40.

In addition, video recognition device 20 generates a fingerprint of each region based on information (the information indicating four video recognition candidate regions 295 to 298 in the example illustrated in FIG. 11B) indicating the video recognition candidate regions obtained from video reception device 40, and performs content specifying processing for each of the regions.

Additional information display control unit 46 instructs control unit 41 to obtain additional information from additional information distribution device 30, based on the content specifying processing result of the video recognition candidate regions (e.g. video recognition candidate regions 295 and 296) for which content specifying processing has succeeded. Further, additional information display control unit 46 instructs control unit 41 to display obtained additional information 98 on displaying unit 54.

In this case, additional information display control unit 46 can determine that superimposing information is displayed on video recognition candidate regions for which content specifying processing has failed, and the superimposing information is not displayed on the video recognition candidate regions for which content specifying processing has succeeded. Hence, additional information display control unit 46 sets a display position of additional information 98 to the video recognition candidate regions for which content specifying processing has succeeded such that additional information 98 does not overlap the superimposing information (e.g. caption 194), and gives control unit 41 an instruction about the display position. In response to the instruction, control unit 41 controls video output unit 44 or the like to display additional information 98 at the instructed position of the video recognition candidate regions for which content specifying processing has succeeded.

As illustrated in, for example, FIG. 11C, when the content specifying processing with respect to video recognition candidate regions 295 and 296 succeeds and the content specifying processing with respect to video recognition candidate regions 297 and 298 fails, additional information display control unit 46 instructs control unit 41 to display additional information 98 on video recognition candidate regions 295 and 296 for which content specifying processing has succeeded. Control unit 41 which has received this instruction controls video output unit 44 or the like to display additional information 98 in video recognition candidate regions 295 and 296. Thus, additional information 98 is displayed at the upper portion of displaying unit 54 at which additional information 98 does not overlap caption 294 as illustrated in, for example, FIG. 11D.

In addition, FIGS. 9C, 10D and 11D illustrate examples where additional information is displayed at the upper portion of displaying unit 54. However, these examples are only examples of the display position of the additional information, and a display position, a display size and the like of additional information are by no means limited to a display position, a display size and the like of additional information illustrated in FIGS. 9C, 10D and 11D.

Next, the content specifying processing based on the video recognition processing performed in step S12 will be described.

[1-2-7. Operation of Content Specifying Processing]

Figure 12:
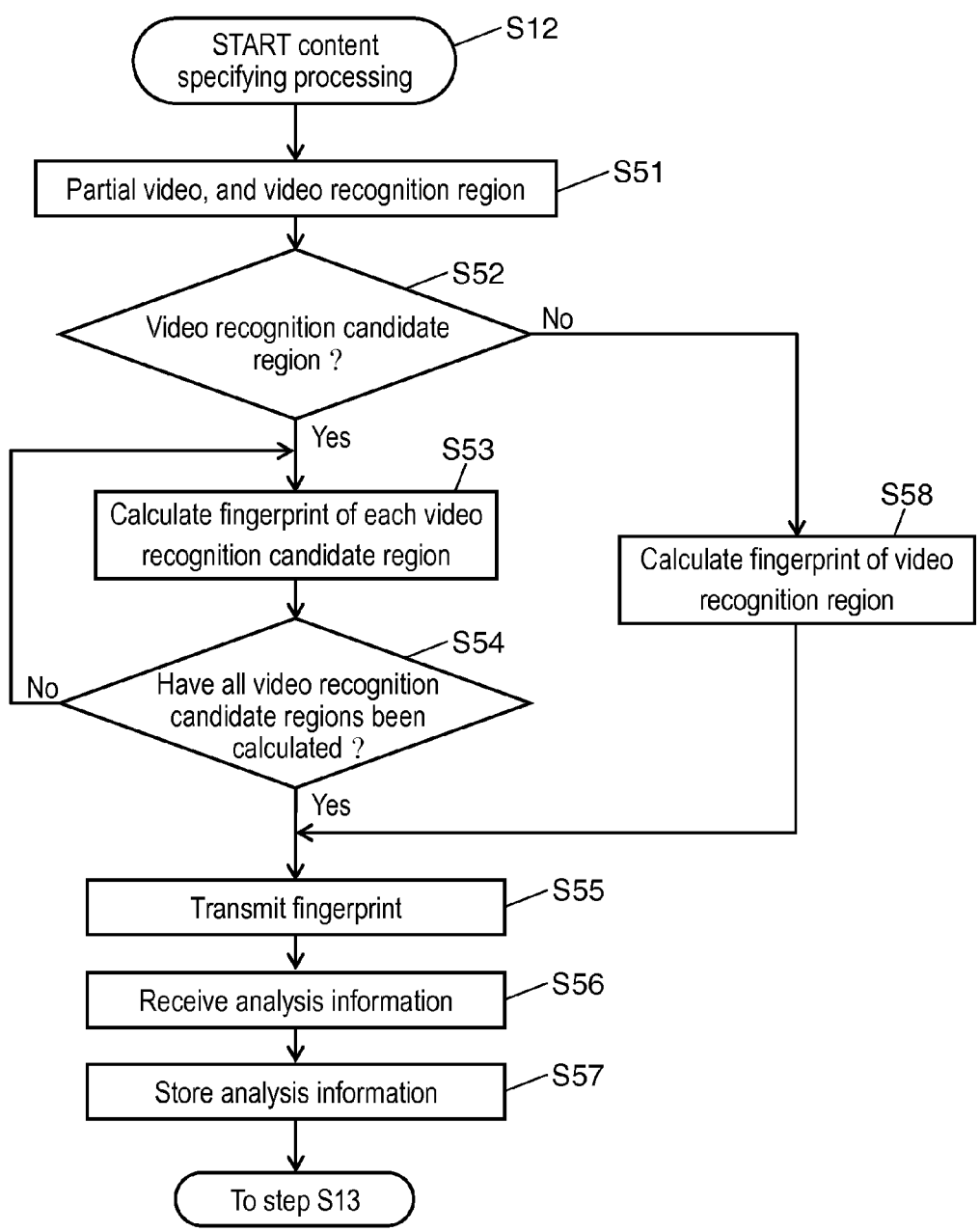
FIG. 12 is a flowchart schematically illustrating an operation of the content specifying processing performed by the video reception device according to the first exemplary embodiment.

FIG. 12 is a flowchart schematically illustrating an operation of content specifying processing performed by video reception device 40 according to the first exemplary embodiment.

Additional information display control unit 46 of video reception device 40 obtains the partial video extracted by video extraction unit 45, and information indicating the video recognition region or the video recognition candidate regions set by video recognition region setting unit 66 (step S51).

Additional information display control unit 46 determines which one of a video recognition region and video recognition candidate regions is set by video recognition region setting unit 66 (step S52).

When it is determined in step S52 that the video recognition candidate regions have been set by video recognition region setting unit 66 (Yes), additional information display control unit 46 calculates a fingerprint of each video recognition candidate region (step S53). Additional information display control unit 46 repeats step S53 until fingerprints of all video recognition candidate regions are calculated (step S54).

Additional information display control unit 46 instructs control unit 41 to transmit all fingerprints calculated in step S53, to video recognition device 20. Control unit 41 which has received this instruction controls each circuit block to transmit all fingerprints calculated in step S53 together with a video recognition request to video recognition device 20 through HTTP transmission/reception unit 42 and communication network 16 (step S55).

Additional information display control unit 46 may instruct control unit 41 to transmit the information indicating the video recognition candidate regions together with the fingerprints to video recognition device 20.

Video recognition device 20 which has received the fingerprints performs the content specifying processing (the content specifying processing based on the video recognition processing) related to the video recognition candidate regions using these fingerprints. Further, video recognition device 20 returns the analysis information of the content specifying processing results to video reception device 40.

In this case, video recognition device 20 generates a plurality of fingerprints based on the information indicating the video recognition candidate regions obtained from video reception device 40, and performs the content specifying processing for each of the video recognition candidate regions using these fingerprints.

When it is determined in step S52 that the video recognition region has been set by video recognition region setting unit 66 (No), additional information display control unit 46 calculates a fingerprint of the video recognition region (step S58).

Additional information display control unit 46 instructs control unit 41 to transmit the fingerprint calculated in step S58, to video recognition device 20. Control unit 41 which has received this instruction controls each circuit block to transmit the fingerprint calculated in step S58 together with a video recognition request to video recognition device 20 through HTTP transmission/reception unit 42 and communication network 16 (step S55).

Additional information display control unit 46 may instruct control unit 41 to transmit the information indicating the video recognition region together with the fingerprint to video recognition device 20.

Video recognition device 20 which has received the fingerprint performs the content specifying processing (the content specifying processing based on the video recognition processing) using the fingerprint. Further, video recognition device 20 returns the analysis information of the content specifying processing result to video reception device 40.

In this case, video recognition device 20 generates the fingerprint based on the information indicating the video recognition region obtained from video reception device 40, and performs the content specifying processing.

Control unit 41 of video reception device 40 controls each circuit block to receive through HTTP transmission/reception unit 42 the analysis information (the content specifying processing result) transmitted from video recognition device 20 through communication network 16 as the result of step S55, and transfers the received analysis information to additional information display control unit 46 (step S56).

Additional information display control unit 46 which has received the analysis information instructs control unit 41 to store this analysis information in storage unit 47. Control unit 41 which has received this instruction controls each circuit block to store the obtained analysis information in storage unit 47 (step S57). Subsequently, the flow moves to step S13 in FIG. 5.

[1-3. Effect and Others]

As described above, in the present exemplary embodiment, video reception device 40 is configured to transmit and receive data through communication network 16, and includes input unit 65, video extraction unit 45, video recognition region setting unit 66, control unit 41 and additional information display control unit 46. Input unit 65 is configured to receive an input of video signals output from the video transmission device (e.g. STB 14) installed outside, and content related information including feature information. Video extraction unit 45 is configured to extract a partial video for video recognition processing, from the video signals. Video recognition region setting unit 66 is configured to set a video recognition region to the partial video based on the feature information included in the content related information. Control unit 41 is configured to perform control of transmitting a fingerprint to video recognition device 20 connected to communication network 16 so as to request video recognition device 20 to perform the video recognition processing, obtaining a video recognition processing result from video recognition device 20, and obtaining additional information (e.g. advertisement information) based on the video recognition processing result from additional information distribution device 30 connected to communication network 16. Additional information display control unit 46 is configured to generate the fingerprint of the video recognition region of the partial video.

For example, some video transmission devices such as STB 14 can superimpose superimposing information such as a caption, an OSD or the like on video signals transmitted from broadcast station 12 and output the video signals. However, such superimposing information is not included in a video of content which video recognition device 20 obtains from broadcast station 12. Hence, when a fingerprint is generated from video signals including the superimposing information, and video recognition device 20 is requested to perform video recognition processing based on this fingerprint, video recognition device 20 is likely to fail in the video recognition processing (the content specifying processing based on the video recognition processing) using this fingerprint.

However, video reception device 40 according to the present exemplary embodiment is configured such that video recognition region setting unit 66 sets a video recognition region to a partial video based on feature information included in the content related information, and additional information display control unit 46 generates a fingerprint of the video recognition region of the partial video. Consequently, video reception device 40 can generate for video signals input from the video transmission device the fingerprint of the video recognition region set to a region except for superimposing information such as a caption or an OSD. Consequently, it is possible to precisely perform the video recognition processing (the content specifying processing based on the video recognition processing) using video recognition device 20.

Further, broadcast station 12 broadcasts 3D video content in some cases. Furthermore, in video reception device 40 according to the present exemplary embodiment, when content related information includes feature information related to a transmission method of 3D video signals, video recognition region setting unit 66 can set a video recognition region based on this information to the partial video. Consequently, video reception device 40 can generate a fingerprint corresponding to a 3D video for 3D video content, and perform precise video recognition processing (content specifying processing based on the video recognition processing) using video recognition device 20.

Further, video reception device 40 can obtain additional information based on the video recognition processing result from additional information distribution device 30, and superimpose the additional information on the video signals.

Furthermore, video reception device 40 may include displaying unit 54 which is configured to display a video obtained by superimposing additional information 51 on video signals.

Still further, video recognition region setting unit 66 may be configured to, when content related information includes feature information related to superimposing information, set the video recognition region to a region except for a region on which the superimposing information is superimposed.

Consequently, video recognition region setting unit 66 can set a video recognition region to a region which does not include superimposing information such as a caption or an OSD. That is, additional information display control unit 46 can generate a fingerprint of a video recognition region set to a region except for superimposing information such as a caption or an OSD. Consequently, video reception device 40 can precisely perform the video recognition processing (content specifying processing based on the video recognition processing) using video recognition device 20.

Further, additional information display control unit 46 may be configured to perform control of superimposing the additional information on the video recognition region of the video signals.

Consequently, video reception device 40 can display the additional information at a position at which the additional information does not overlap the superimposing information. Consequently, even when superimposing information such as a caption or an OSD is superimposed on video signals input from the video transmission device, video reception device 40 can prevent visibility lowering that is caused when the additional information hides the superimposing information.

Other Exemplary Embodiment

As described above, the first exemplary embodiment has been described as an exemplary technique disclosed in the present application. However, the technique according to the present disclosure is not limited to this, and is also applicable to exemplary embodiments which are optionally changed, replaced, added and omitted. Further, each component described in the above first exemplary embodiment can also be combined to provide new exemplary embodiments.

Another exemplary embodiment will be described below.

A configuration where video reception device 40 includes displaying unit 54 has been described in the first exemplary embodiment. However, the video reception device according to the present exemplary embodiment is by no means limited to this configuration. The video reception device may not include the displaying unit.

Figure 13:
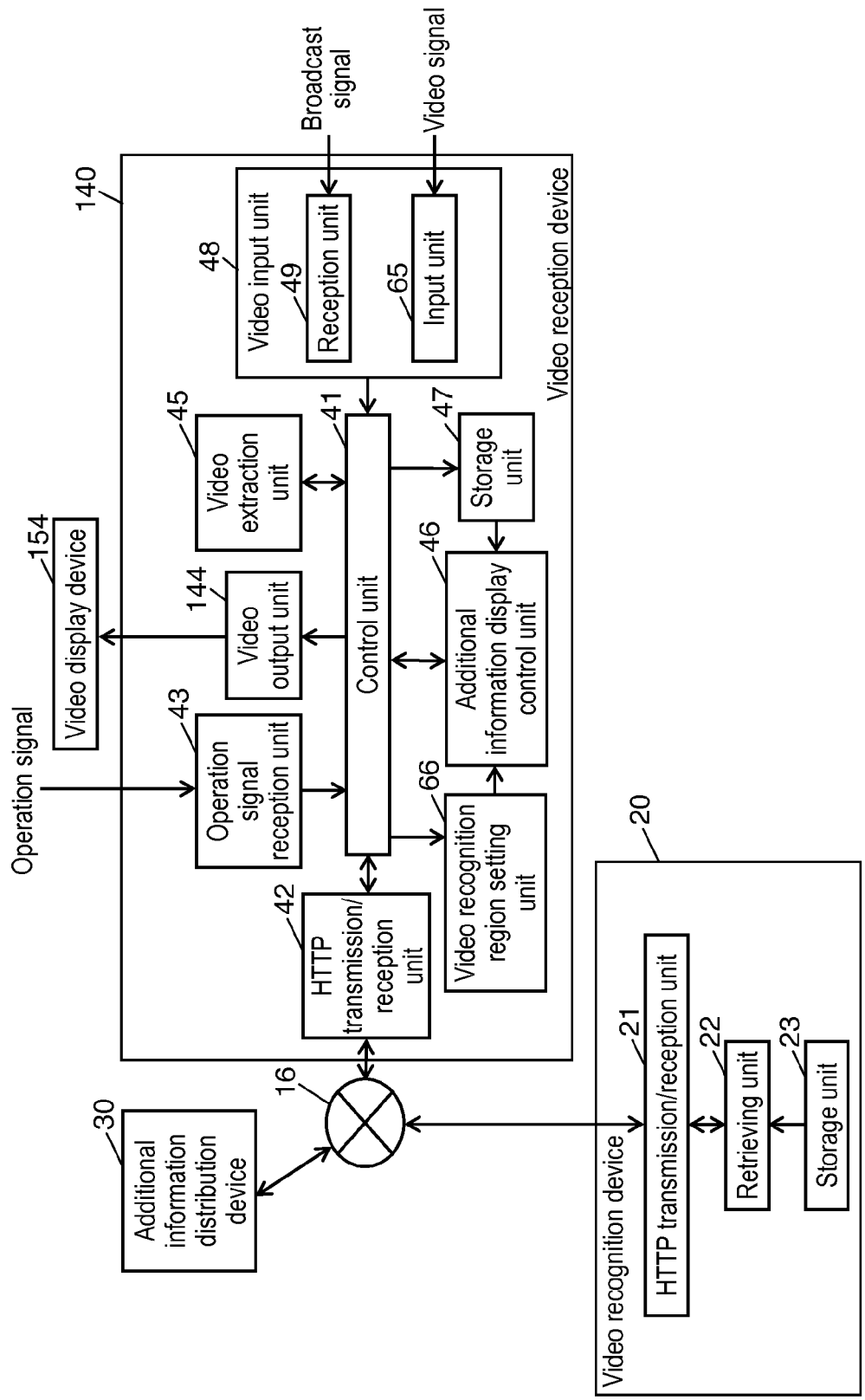
FIG. 13 is a block diagram schematically illustrating an example of configurations of a video recognition device and a video reception device according to another exemplary embodiment.

FIG. 13 is a block diagram schematically illustrating an example of a configuration of video reception device 140 according to another exemplary embodiment. Video reception device 140 illustrated in FIG. 13 differs from video reception device 40 illustrated in FIG. 2 in the first exemplary embodiment in the following points. Video reception device 140 does not include displaying unit 54, and video output unit 144 is configured to output video signals to video display device 154 installed outside through wire or by radio.

Video reception device 140 of this type is, for example, a recording device which has, for example, a recording function, a broadcast signal receiving function, a video signal input function and a video signal output function, and which is configured to transmit video signals to video display device 154 installed outside. Such a recording device is, for example, a hard disk recorder, a DVD recorder, a BD recorder or the like.

In addition, in FIG. 13, components which perform substantially the same operations as components which make up video reception device 40 illustrated in FIG. 2 will be assigned the same reference numerals, and will not be described. Further, FIG. 13 illustrates a main circuit block related to an operation described in the present exemplary embodiment, and does not illustrate functions and circuit blocks (e.g. a recording function) related to other operations.

In video reception device 140, additional information display control unit 46 determines whether or not to superimpose additional information 51 on video signals output from video output unit 144 to video display device 154. In addition, an operation of additional information display control unit 46 is substantially the same as that of the first exemplary embodiment. Video reception device 140 employing such a configuration can provide the same effects as those of video reception device 40 described in the first exemplary embodiment.

In addition, video recognition region setting unit 66 may be configured to, when content related information does not include feature information or when content related information is not output from the video transmission device, instruct control unit 41 to output a signal for requesting an output of the content related information including the feature information, to the video transmission device. Consequently, when the video transmission device does not output feature information related to superimposing information such as a caption or an OSD, video reception devices 40 and 140 can request the video transmission device to output content related information including the feature information.

In addition, each component described in the present exemplary embodiment may be configured as an independent circuit. Alternatively, each circuit block may be configured such that a program created to realize one or a plurality of operations is executed by a processor. Further, this program may be obtained by being downloaded from a server or the like or may be obtained through a predetermined recording medium (e.g. an optical disk such as a CD-ROM, a magnetic disk or a semiconductor memory).

Furthermore, each operation of the server described in the present exemplary embodiment may be collectively processed by a single server or may be distributed to and processed by a plurality of servers.

In addition, specific numerical values described in the first exemplary embodiment are only exemplary numerical values in the exemplary embodiment, and the present disclosure is by no means limited to these numerical values. Each numerical value is desirably set to an optimal value according to a specification of a video reception device or the like.

INDUSTRIAL APPLICABILITY

The present disclosure is applicable to a video reception device which can obtain additional information related to video signals input from a video transmission device installed outside, and superimpose the obtained additional information on the video signals. More specifically, the present disclosure is applicable to a television receiver, a hard disk recorder, a DVD recorder, a BD recorder and the like.

REFERENCE MARKS IN THE DRAWINGS 10 additional information display system
12 broadcast station
14 STB
16 communication network
20 video recognition device
21, 42 HTTP transmission/reception unit
22 retrieving unit
23, 47 storage unit
30 additional information distribution device
40, 140 video reception device
41 control unit
43 operation signal reception unit
44, 144 video output unit
45 video extraction unit
46 additional information display control unit
48 video input unit
49 reception unit
50 video
51, 98 additional information
54 displaying unit
65 input unit
66 video recognition region setting unit
71, 72, 93, 93R, 93L, 193 video recognition region
91, 91R, 91L, 191, 291 video signal
92 superimposing region information
92LR 3D video information
94, 194, 294 caption
101, 102, 103, 104 analysis information
154 video display device
195 superimposing region
295, 296, 297, 298 video recognition candidate region

The invention claimed is:

1. A video reception device configured to transmit and receive data through a communication network, the video reception device comprising:
   an input unit configured to receive an input of a video signal, and content related information including feature information indicating a feature of the video signal;
   a video extraction unit configured to extract a partial video for video recognition processing, from the video signal;
   a video recognition region setting unit configured to set a video recognition region to the partial video based on the feature information;
   a control unit configured to perform control of transmitting content recognition information to a video recognition device connected to the communication network so as to request the video recognition device to perform the video recognition processing, obtaining a result of the video recognition processing from the video recognition device, and obtaining additional information based on the result of the video recognition processing from an additional information distribution device connected to the communication network; and
an additional information display control unit configured to generate the content recognition information in the video recognition region of the partial video.

2. The video reception device according to claim 1, further comprising:
a displaying unit configured to display a video obtained by superimposing the additional information on the video signal.

3. The video reception device according to claim 1, wherein the additional information display control unit is configured to perform control of superimposing the additional information on the video recognition region of the video signal.

4. The video reception device according to claim 1, wherein the video recognition region setting unit is configured to instruct the control unit to output a signal for requesting the content related information when not receiving the content related information.

5. The video reception device according to claim 1, wherein the video recognition region setting unit is configured to, when the content related information includes the feature information related to superimposing information, set the video recognition region to a region except for a region on which the superimposing information is superimposed.

6. A video recognition method of a video reception device configured to transmit and receive data through a communication network, the video recognition method comprising:
extracting a partial video for video recognition processing, from a video signal;
receiving content related information including feature information indicating a feature of the video signal;
setting a video recognition region to the partial video based on the feature information;
generating content recognition information in the video recognition region of the partial video;
transmitting the content recognition information to a video recognition device connected to the communication network so as to request the video recognition device to perform the video recognition processing, and obtaining a result of the video recognition processing from the video recognition device; and
obtaining additional information based on the result of the video recognition processing, from an additional information distribution device connected to the communication network.

7. The video recognition method according to claim 6, further comprising:
displaying, on a displaying unit, a video obtained by superimposing the additional information on the video signal.

8. The video recognition method according to claim 6, further comprising:
superimposing the additional information on the video recognition region of the video signal.

9. The video recognition method according to claim 6, further comprising:
outputting a signal for, requesting the content related information when the content related information is not input.

10. The video recognition method according to claim 6, wherein, when the content related information includes the feature information related to a caption, the video recognition region is set to a region except for a region on which the caption is superimposed.

11. An additional information display system which comprises a video reception device, a video recognition device, and an additional information distribution device, the devices being configured to transmit and receive data to each other through a communication network,
wherein the video reception device includes:
an input unit configured to receive an input of a video signal, and content related information including feature information indicating a feature of the video signal;
a video extraction unit configured to extract a partial video for video recognition processing, from the video signal;
a video recognition region setting unit configured to set a video recognition region to the partial video based on the feature information;
a control unit configured to perform control of transmitting content recognition information to the video recognition device through the communication network so as to request the video recognition device to perform the video recognition processing, obtaining a result of the video recognition processing from the video recognition device through the communication network, and obtaining additional information based on the result of the video recognition processing from the additional information distribution device through the communication network; and
an additional information display control unit configured to generate the content recognition in formation in the video recognition region of the partial video,
wherein the video recognition device is configured to perform the video recognition processing on the content recognition information received through the communication network, and transmit the result of the video recognition processing to the video reception device through the communication network, and
wherein the additional information distribution device is configured to transmit the additional information corresponding to the result of the video recognition processing received through the communication network, to the video reception device through the communication network.

* * * * *